US007036354B2

(12) United States Patent
Itakura et al.

(10) Patent No.: US 7,036,354 B2
(45) Date of Patent: May 2, 2006

(54) TROUBLE DIAGNOSTICS APPARATUS FOR FUEL TREATMENT SYSTEM

(75) Inventors: Eiji Itakura, Edogawa-ku (JP); Tetsuyuki Ooe, Funabashi (JP); Kazuyuki Yada, Urayasu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 40 days.

(21) Appl. No.: 10/953,410

(22) Filed: Sep. 30, 2004

(65) Prior Publication Data

US 2005/0072221 A1 Apr. 7, 2005

(30) Foreign Application Priority Data

Oct. 7, 2003 (JP) ............................ 2003-347707

(51) Int. Cl.
*G01M 15/00* (2006.01)

(52) U.S. Cl. ......................................... 73/40; 73/118.1

(58) Field of Classification Search .................... 73/40, 73/46, 47, 49.7, 112, 115, 116, 117.2, 117.3, 73/118.1

See application file for complete search history.

(56) References Cited

U.S. PATENT DOCUMENTS

| | | | | |
|---|---|---|---|---|
| 6,374,663 | B1 * | 4/2002 | Muller et al. | 73/49.2 |
| 2002/0100314 | A1 * | 8/2002 | Docy et al. | 73/49.2 |
| 2003/0015022 | A1 * | 1/2003 | Stegmann et al. | 73/40.5 R |
| 2004/0261506 | A1 * | 12/2004 | Amlin | 73/49.7 |

FOREIGN PATENT DOCUMENTS

| | | |
|---|---|---|
| JP | A 06-235355 | 8/1994 |
| JP | A 2002-004959 | 1/2002 |

* cited by examiner

*Primary Examiner*—Eric S. McCall
(74) *Attorney, Agent, or Firm*—Oliff & Berridge, PLC

(57) ABSTRACT

A pump module 30 is provided for introducing a negative pressure t a fuel tank 10. A tank's internal pressure at a time, upon which a steady-state pressure reaching time elapses after introduction of the negative pressure is started, is detected as a convergence value. It is determined whether or not there is a leak in a system including the fuel tank based on that convergence value. A space volume inside the fuel tank 10 is detected by an output produced by a fuel level gauge 12. The steady-state pressure reaching time is set based on the space volume.

9 Claims, 10 Drawing Sheets

Change in fuel tank's internal pressure during leak detection $T_{SAT}$ $-V_{SP}$ map Pump characteristic Correction time

TROUBLE DIAGNOSTICS APPARATUS FOR FUEL TREATMENT SYSTEM

BACKGROUND OF THE INVENTION

1. Field of the Invention

The present invention relates to a trouble diagnostics apparatus for a fuel treatment system More specifically, the present invention relates to a trouble diagnostics apparatus for a fuel treatment system preferably usable for diagnosing a leak in a system including a fuel tank.

2. Background Art

An example of a trouble diagnostics apparatus for diagnosing a leak in a system including a fuel tank is described in Japanese Patent Laid-open No. 2002-4959. This trouble diagnostics apparatus includes a vacuum pump for introducing a negative pressure to the fuel tank by drawing through suction a gas contained in the fuel tank. A tank's internal pressure is quickly vacuumized when the vacuum pump is operated, if there is no leak in the fuel tank. If there is a leak in the fuel tank, on the other hand, the particular leak prevents the tank's internal pressure from being vacuumized. According to this conventional trouble diagnostics apparatus, therefore, it is possible to determine whether or not there is a leak trouble if the following is done. Specifically, it is determined whether or not the tank's internal pressure is properly vacuumized after the lapse of a predetermined period of time, through which a steady-state pressure is reached, after the vacuum pump has been started.

In the conventional trouble diagnostics apparatus, however, a steady-state pressure reaching time through which the tank's internal pressure reaches the steady-state pressure is not constant. Accordingly, if an approach is taken in which a decision is made whether or not there is a leak trouble after the lapse of the predetermined steady-state pressure reaching time using this conventional device, the following problems could result. Specifically, it may be determined whether or not there is a trouble at a stage before the tank's internal pressure is yet to be decreased sufficiently to reach the convergence value. Or, the vacuum pump is kept running unnecessarily after the tank's internal pressure has already reached the convergence value.

SUMMARY OF THE INVENTION

An object of the present invention is therefore to provide a trouble diagnostics apparatus for a fuel treatment system capable of determining whether or not there is a leak trouble at an appropriate timing at which a tank's internal pressure reaches a convergence value after a pressure introduction to a fuel tank has been started.

The above object of the present invention is achieved by a trouble diagnostics apparatus for a fuel treatment system. The apparatus includes a fuel tank a pressure introduction mechanism for introducing a positive pressure or a negative pressure to the fuel tank; a convergence value detection device for detecting, as a convergence value, a tank's internal pressure at a time upon which a steady-state pressure reaching time elapses after introduction of the positive pressure or negative pressure is started; a leak trouble determination device for determining, based on the convergence value, whether or not there is a leak occurring in a system including the fuel tank; a space volume detection device for detecting a space volume of the system including the fuel tank; and a steady-state pressure reaching time setting device for setting the steady-state pressure reaching time based on the space volume.

The above object of the present invention is achieved by a trouble diagnostics apparatus for a fuel treatment system. The apparatus includes a fuel tank; a pressure introduction mechanism for introducing a positive pressure or a negative pressure to the fuel tank; a convergence value detection device for detecting, as a convergence value, a tank's internal pressure at a time upon which a steady-state pressure reaching time elapses after introduction of the positive pressure or negative pressure is stared; a leak trouble determination device for determining, based on the convergence value, whether or not there is a leak occurring in a system including the fuel tank; a characteristic detection device for detecting a pressure introduction characteristic of the pressure introduction mechanism; and a steady-state pressure reaching time setting device for setting the steady-state pressure reaching time based on the pressure introduction characteristic detected.

The above object of the present invention is achieved by a trouble diagnostics apparatus for a fuel treatment system. The apparatus includes a fuel tank; a pressure introduction mechanism for introducing a positive pressure or a negative pressure to the fuel tank; a convergence value detection device for detecting, as a convergence value, a tank's internal pressure at a time upon which a steady-state pressure reaching time elapses after introduction of the positive pressure or negative pressure is started; a leak trouble determination device for determining, based on the convergence value, whether or not there is a leak occurring in a system including the fuel tank; an amount of air transferred estimation device for eating an amount of air that is assumed to be transferred between the pressure introduction mechanism and the fuel tank as the pressure introduction mechanism is operated; an amount of air leaked estimation device for estimating an amount of air that is assumed to be leaked through the reference hole while the pressure introduction mechanism is operated in a case where there is a reference hole in the fuel tank,; an amount of air increased or decreased estimation device for estimating an amount of air that is assumed to be increased or decreased in the fuel tank based on the amount of air transferred and the amount of air leaked; a tank's internal pressure fluctuation amount calculation device for estimating a tank's internal pressure fluctuation amount corresponding to the amount of air increased or decreased according to a relation of an equation of state of gas; a pressure change estimation device for estimating changes in tank's internal pressure that are assumed to be made after an operation of the pressure introduction mechanism is started based on the tank's internal pressure fluctuation amount; and a steady-state pressure reaching time setting device for setting the steady-state pressure reaching time based on the changes in tank's internal pressure estimated.

The above object of the present invention is achieved by a trouble diagnostics apparatus for a fuel treatment system. The apparatus includes a fuel tank; a pressure introduction mechanism for introducing a positive pressure or a negative pressure to the fuel tank; amount of pressure change detection device for detecting an amount of change in the tank's internal pressure per unit time after introduction of the positive pressure or negative pressure is started; a convergence value detection device for detecting, as a convergence value, the tank's internal pressure at a time point when the amount of change in the tanks internal pressure per unit time becomes a criterion value or less; and a leak trouble determination device for determining whether or not there is a leak in a system including the fuel tank based on the convergence value.

Other objects and further features of the present invention will be apparent from the following detailed description when read in conjunction with the accompanying drawings.

BEST MODE FOR CARRYING OUT THE INVENTION

FIRST EMBODIMENT

]Construction of the Trouble Diagnostics Apparatus According to a First Embodiment of the Present Invention]

Figure 1:
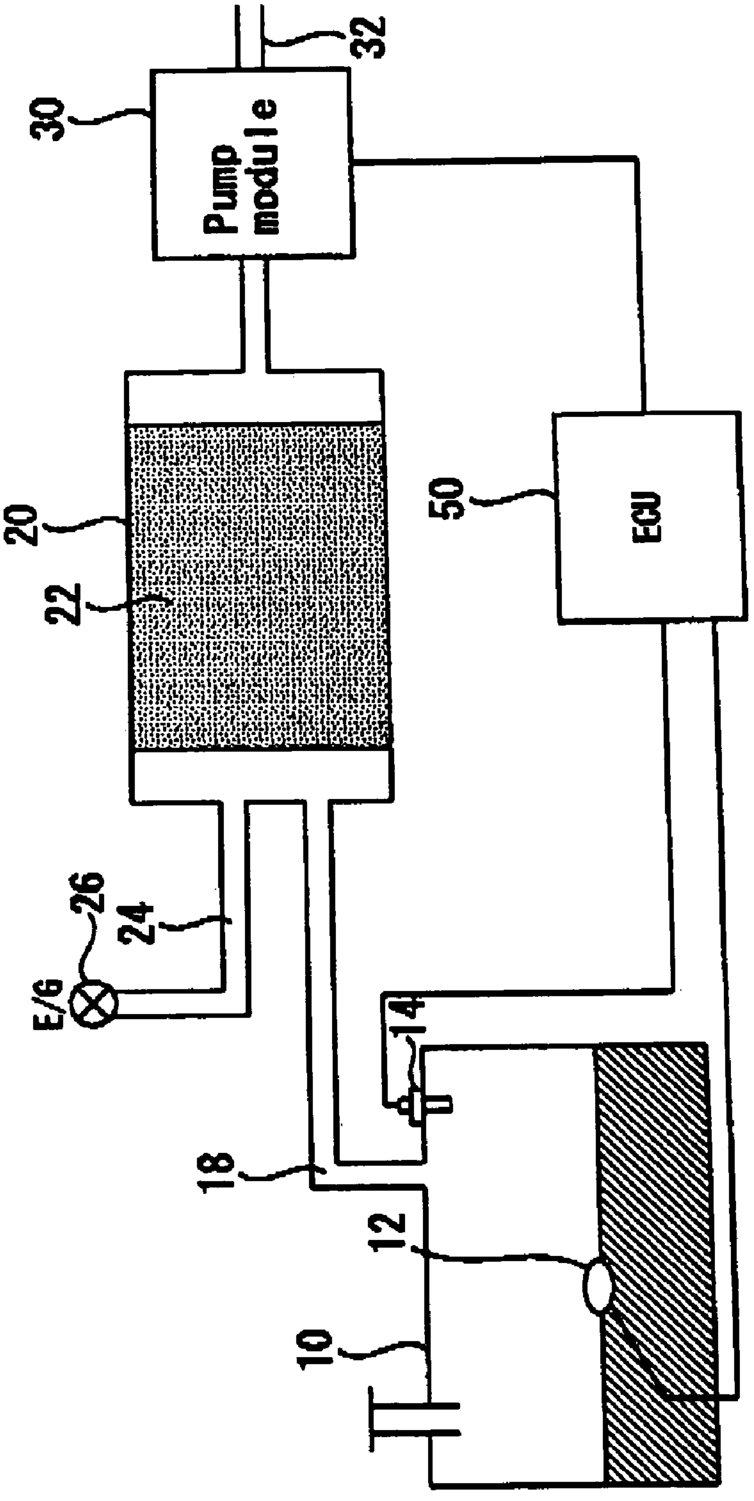
FIG. 1 is a diagram for explaining a construction of a trouble diagnostics apparatus according to a first embodiment of the present invention.

FIG. 1 is a diagram for explaining the construction of system according to a first embodiment of the present invention. The system according to the present embodiment includes a fuel tank 10. A fuel level gauge 12 is provided inside the fuel tank 10. The fuel level gauge 12 produces an output corresponding to a level of a fuel stored in the fuel tank 10. The fuel level gauge 12 allows the amount of fuel still available for use and therefore a space volume inside the fuel tank 10, to be detected.

The fuel tank 10 also includes a tank's internal pressure sensor 14. The tank's internal pressure sensor 14 produces an output corresponding to a pressure inside the fuel tank 10, or more specifically, the tank's internal pressure $P_{TNK}$, The fuel tank 10 communicates with a canister 20 through a vapor passageway 18. The canister 20 is packed with an activated carbon 22. The canister 20 is capable of adsorbing a fuel vapor that flows in from the fuel tank 10.

An intake passageway (not shown) of an internal combustion engine communicates with the canister 20 through a purge passageway 24 and a purge VSV (vacuum switching valve) 26. Opening the purge VSV 26 during operation of the internal combustion engine introduces an intake vacuum into the canister 20. The canister 20 can then be purged when the fuel vapor adsorbed therein is released with air.

A pump module 30 also communicates with the canister 20. More specifically, the pump module 30 communicates with the canister 20 on a side opposite to the vapor passageway 18 and the purge passageway 24 over the activated carbon 22. The pump module 30 is open to atmosphere via an atmospheric passageway 32. The construction of the pump module 30 will be described in detail later with reference to FIG. 2.

The system according to the first embodiment includes an ECU (electronic control unit) 50. Outputs from various sensors, such as the fuel level gauge 12 and the tank's internal pressure sensor 14, are supplied to the ECU 50. The purge VSV 26, the pump module 30, and the lie are electrically connected to the ECU 50. Based on the information provided as the sensor outputs, the ECU 50 drives actuators of different types. The system according to the first embodiment is thereby controlled.

Figure 2:
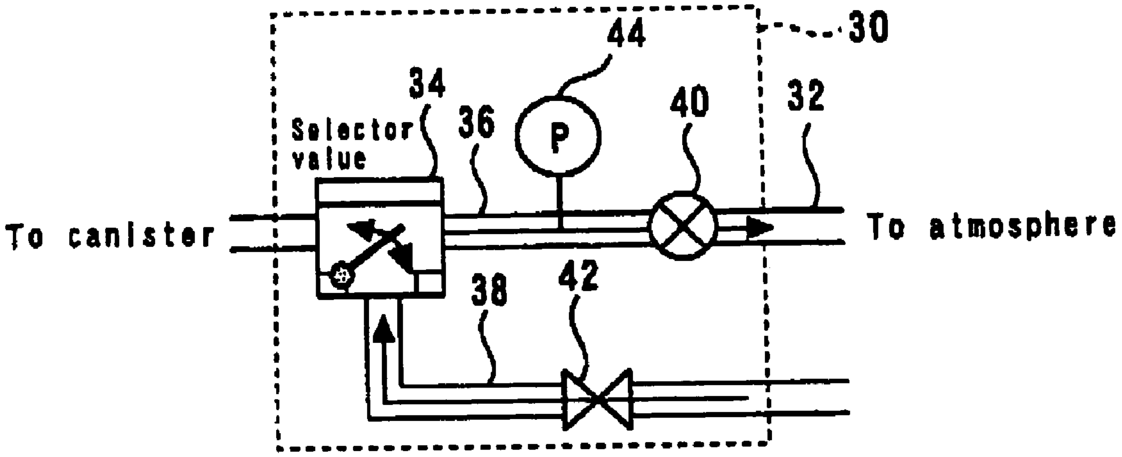
FIG. 2 is a diagram for explaining a construction of a pump module included in the trouble diagnostics apparatus shown in FIG. 1.

FIG. 2 is a diagram for explaining in detail the construction of the pump module 30. Referring to FIG. 2, the pump module 30 includes a selector valve 34 that communicates with the canister 20. The selector valve 34 communicates with a pump passageway 36 and an orifice passageway 38. The pump passageway 36 communicates with the atmospheric passageway 32 via an electric pump 40. The orifice passageway 38 communicates with the atmospheric passageway 32 through an orifice 42.

The selector valve 34 is a two-position solenoid valve. The selector valve 34 selectively realizes either one of the following states. One is a negative pressure introduction state, in which the canister 20 and the pump passageway 36 are kept in communication with each other. The other is a reference pressure generation state, in which the orifice passageway 38 is brought in communication with the pump passageway 36. The electric pump 40 functions to discharge a gas on the side of the pump passageway 36 to the side of the atmospheric passageway 32. The orifice 42 is a reference hole having the dimension of a reference diameter (e.g. f 0.5 mm).

In the pump module 30, if the electric pump 40 is operated with the selector valve 34 placed in the position of the reference pressure generation state, a negative pressure can be introduced into the orifice passageway 38. In this case, the pressure in an entire system from the pump passageway 36 to the orifice passageway 38 converges on a value that balances the amount of air flowing in from the orifice 38 with the amount of air discharged by the electric pump 40, That is, in this case, there is developed in the pump passageway 36 a pressure that accords with a convergence value of pressure produced in a system having the reference hole (f 0.5 mm) when air is discharged by the electric pump 40 from the system. This pressure is hereinafter referred to as a "reference pressure $P_{REF}$."

The pump module, 30 includes a pressure sensor 44 for detecting pressure in the pump passageway 36. According to the system of the embodiment, therefore, the reference pressure $P_{REF}$ can be detected using the pressure sensor 44 by operating the electric pump 40 with the selector valve 34 placed in the position of the reference pressure generation state.

The internal pressure of the pump passageway 36 converges on the atmospheric pressure, if the electric pump 40 remains stationary and the selector valve 34 is placed in the position of the reference pressure generation state, or the internal combustion engine remains stationary. Under these conditions, therefore, the atmospheric pressure can be detected using the pressure sensor 44.

If the selector valve 34 of the pump module 30 is placed in the position of the negative pressure introduction state, the negative pressure is introduced to the canister 20 when the electric pump 40 is operated. If the purge VSV 26 is closed in this case, the negative pressure introduced to the canister 20 can be guided to the fuel tank 10. More specifically, in the system of the first embodiment, if the electric pump 40 is operated with the purge VSV 26 closed and the selector valve 34 placed in the position of the negative pressure introduction state, the negative pressure can be introduced in an enclosed space including the fuel tank 10. In this case, the pressure in the enclosed space can be detected using the tank's internal pressure sensor 14 or the pressure sensor 44 of the pump module 30.

[Relation Between Tank's Internal Pressure $P_{TNK}$ and Space Volume]

Figure 3:
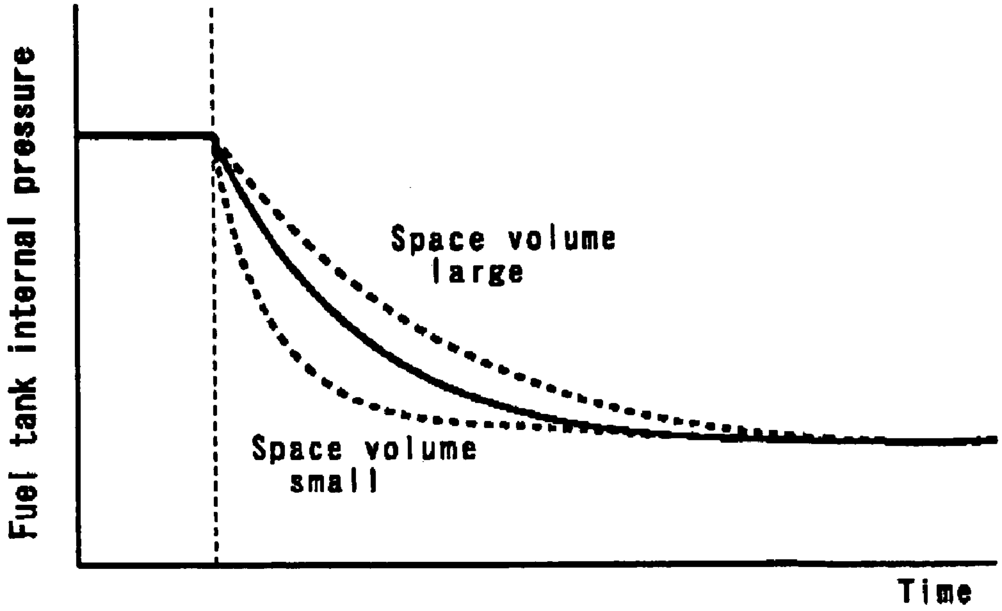
FIG. 3 is a graph showing changes in a tank's internal pressure $P_{TNK}$ observed after the introduction of a negative pressure to a fuel tank is started in the trouble diagnostics apparatus shown in FIG. 1.

FIG. 3 is a graph for explaining changes in the tank's internal pressure $P_{TNK}$ that may occur when negative pressure is introduced in the enclosed space including the fuel tank 10 by the pump module 30. When the negative pressure is introduced into the fuel tank 10, the tank's internal pressure $P_{TNK}$ decreases with time as shown in FIG. 3. The tank's internal pressure $P_{TNK}$ eventually converges on a value (hereinafter referred to as the convergence value $P_{SAT}$) corresponding to a capacity of the electric pump 40. The convergence value $P_{SAT}$ takes varying values according to a sealing degree of the system including the fuel tank 10 as follows: the higher the sealing degree, the lower the value, and the lower the sealing degree, the higher the value. Specifically, the convergence value $P_{SAT}$ of the tank's internal pressure $P_{TNK}$ becomes higher when there is a leak in the system including the fuel tank 10 than when there is no leak in the system.

The reference pressure $P_{REF}$ described earlier is the convergence value of the pressure reached when a system having a 0.5-mm-diameter reference hole is vacuumized by the electric pump 40. By comparing the convergence value $P_{SAT}$ with the reference pressure $P_{REF}$, therefore, it can be determined whether or not there is a leak larger than the reference hole in the system including the fuel tank 10. More specifically, if the convergence value $P_{SAT}$ of the tank's internal pressure $P_{TNK}$ reaches a level lower than the reference pressure $P_{REF}$, it can then be concluded that there is no leak greater than the reference hole in the system including the fuel tank 10. If, on the other hand, the convergence value $P_{SAT}$ does not drop to the reference pressure $P_{REF}$, it can then be concluded that there is a leak greater than the reference hole in the system including the fuel tank 10. The apparatus of the first embodiment thus makes it possible to accurately diagnose if there is a leak larger than the system including the fuel tank 10 by the following procedure. Specifically, $P_{SAT}$ is compared with $P_{REF}$ only after the tank's internal pressure $P_{TNK}$ reaches the convergence value $P_{SAT}$ after the sequence of introducing negative pressure into the fuel tank 10 carried out by the electric pump 40 is started.

The time it takes the tank's internal pressure $P_{TNK}$ to reach the convergence value $P_{SAT}$ after the sequence to introduce negative pressure into the fuel tank 10 is started (hereinafter referred to as the "steady-state pressure reaching time $T_{SAT}$") is not constant. FIG. 3 shows the way how the steady-state pressure reaching time $T_{SAT}$ changes according to the space volume $V_{SP}$ inside the fuel tank 10. Specifically, in a condition, in which a large space volume $V_{SP}$ exists in the fuel tank 10, it is necessary to discharge a large amount of gas for decreasing the tank's internal pressure $P_{TNK}$ sufficiently. This results in the steady-state pressure reaching time $T_{SAT}$ of the tank's internal pressure $P_{TNK}$ being prolonged. In a condition, in which the space volume $V_{SP}$ is small, on the other hand, the amount of gas to be discharged is small The steady-state pressure reaching time $T_{SAT}$ then becomes shorter.

Figure 4:
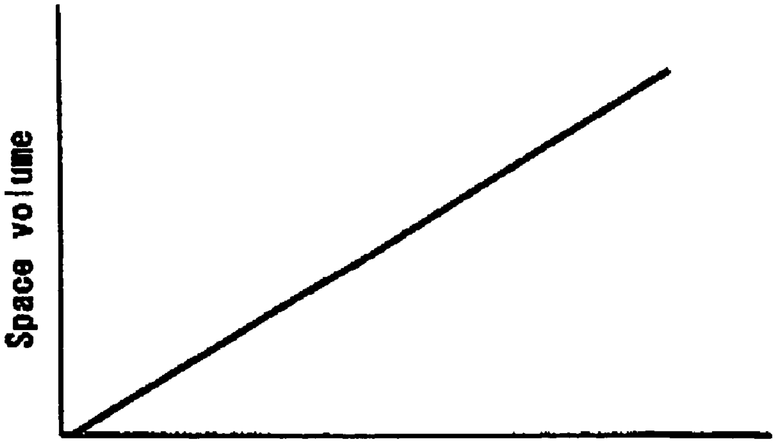
FIG. 4 is a typical map showing a relation between a steady-state pressure reaching time $T_{SAT}$ required for the tank's internal pressure $P_{TNK}$ to reach a convergence value $P_{SAT}$ and a space volume $V_{SP}$.

FIG. 4 is a typical map showing a relation between the steady-state pressure reaching time $T_{SAT}$ described above and the space volume $V_{SP}$. Referring to FIG. 4, the relation between the steady-state pressure reaching time $T_{SAT}$ and the space volume $V_{SP}$ is substantially uniquely determined in advance relative to a hardware configuration including the electric pump 40 and the like, if the hardware configuration is fixed. The space volume $V_{SP}$ of the fuel tank 20 can be detected based on the output produced by the fuel level gauge 12, since the volume of the fuel tank 10 is known. The apparatus according to the first embodiment thus enables to calculate the space volume $V_{SP}$ based on the output produced by the fuel level gauge 12. In addition, the apparatus can calculates the steady-state pressure reaching time $T_{SAT}$ of the tank's internal pressure $P_{TNK}$ based on the space volume $V_{SP}$.

The convergence value $P_{SAT}$ of the tank's internal pressure $P_{TNK}$ may be compared with the reference pressure $P_{REF}$ to diagnose a leak trouble in a systems. Accurate diagnosis of leak trouble cannot be realized if, in this case, the comparison is made before the tank's internal pressure $P_{TNK}$ reaches the convergence value $P_{SAT}$. To minimize load on the electric motor 40 and thereby improve durability of the motor 40, on the other hand, it is desirable that the comparison be made immediately after the tank's internal pressure $P_{TNK}$ reaches the convergence value $P_{SAT}$ and the electric motor 40 be not kept running unnecessarily thereafter. To this end, it is desirable that the steady-state pressure reaching time $T_{SAT}$ be set as accurately as possible, if it is determined whether or not there is a leak through a comparison made between the convergence value $P_{SAT}$ and the reference pressure $P_{REF}$. Thus, the apparatus according to the first embodiment, which determines whether or not there is a leak trouble by using the aforementioned technique, sets the steady-state pressure reaching time $T_{SAT}$ accurately based on the space volume $V_{SP}$ of the fuel tank 10 as a preceding step for the diagnostic procedure.

Specific Processing in the First Embodiment

Figure 5:
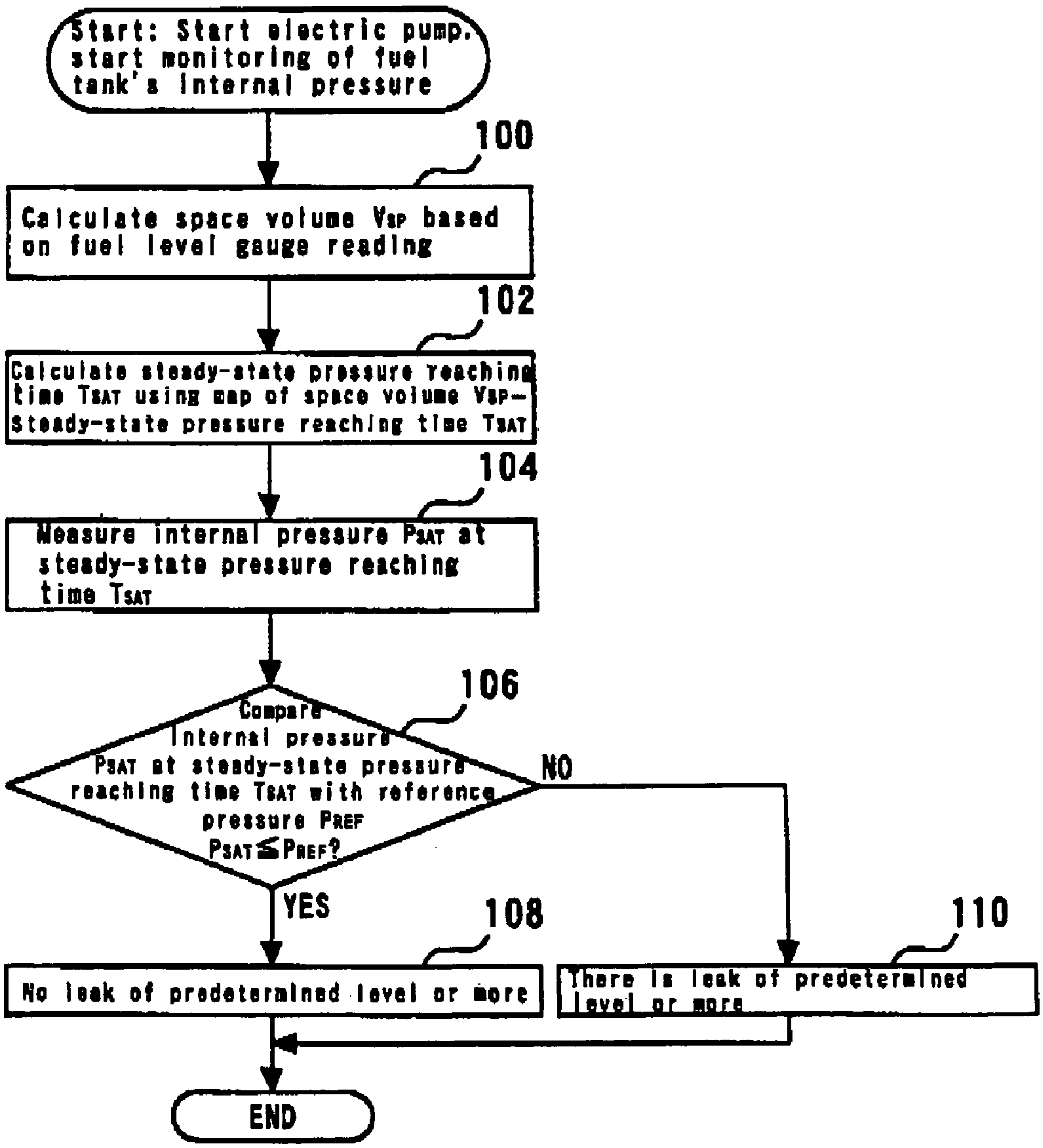
FIG. 5 is a flowchart showing a routine executed in the trouble diagnostics apparatus according to the first embodiment of the present invention.

FIG. 5 is a flowchart showing a routine executed by the ECU 50 of the first embodiment in order to achieve the aforementioned purposes. This routine is executed immediately after the reference pressure $P_{REF}$ is detected through the use of the aforementioned technique. In the apparatus of the first embodiment, the electric pump 40 is started and monitoring of the tank's internal pressure $P_{TNK}$ is started at the same time that the routine is started.

According to the routine shown in FIG. 5, the space volume $V_{SP}$ inside the fuel tank 10 is first calculated based on the remaining fuel amount indicated by the fuel level gauge 12 (step 100). Next, the space volume $V_{SP}$-to-steady-state pressure reaching time $T_{SAT}$ map as shown in FIG. 4 is referenced. The steady-state pressure reaching time $T_{SAT}$ corresponding to the space volume $V_{SP}$ obtained through the calculation performed in the preceding step is thereby calculated (step 102).

The tank's internal pressure $P_{TNK}$ after the lapse of the steady-state pressure reaching time $T_{SAT}$ is next measured as the convergence value $P_{SAT}$ (step 104). More specifically, in this step, it is repeatedly determined whether or not the elapsed time after the routine as shown in FIG. 5 is started reaches the steady-state pressure reaching time $T_{SAT}$ set in step 102. This elapsed time is, in other words the time that elapses after the electric pump 40 is started. If a decision is made in the affirmative, the tank's internal pressure $P_{TNK}$ at that particular point in time is measured as the convergence value $P_{SAT}$.

When the convergence value $P_{SAT}$ of the tank's internal pressure $P_{TNK}$ is measured, the measured value is compared with the reference pressure $P_{REF}$ (step 106). If $P_{SAT} \leqq P_{REF}$ holds true, as a result of the comparison made, it is determined that there is no leak equivalent to, or more than, the reference hole (step 108). If it is determined that the condition of $P_{SAT} \leqq P_{REF}$ does not hold true, a decision is made that there is a leak exceeding the reference hole (step 110). When these processing steps are completed, the electric pump 40 is brought to a stop and monitoring of the tanks internal pressure $P_{TNK}$ is also stopped.

As described in the foregoing, the following purpose can be accomplished according to the routine shown in FIG. 5. Specifically, the steady-state pressure reaching time $T_{SAT}$ is set properly based on the space volume $V_{SP}$ of the fuel tank 10 and the tank's internal pressure $P_{TNK}$ after the lapse of $T_{SAT}$ can be measured as convergence value $P_{SAT}$. In this case, it is possible to detect the convergence value $P_{SAT}$ of the tank's internal pressure $P_{TNK}$ accurately by simply monitoring if the steady-state pressure reaching time $T_{SAT}$ elapses or not. At this time, there is no need at all to continue monitoring the tank's internal pressure $P_{TNK}$ during the course of introducing the negative pressure. With the apparatus of the first embodiment, therefore, a leak trouble in the apparatus can be accurately diagnosed through extremely simple processing and without having to keep running the electric pump 40 wastefully.

According to the first embodiment described above, negative pressure is introduced into the fuel tank 10 in order to determine whether or not there is a leak trouble. The present invention is not limited to this approach; rather, other approaches may be employed according to the present invention. Specifically, a decision may be made as to whether or not there is a leak trouble by introducing a positive pressure to the fuel tank 10. The same holds true in this respect in other embodiments described below.

SECOND EMBODIMENT

[Features of the Second Embodiment]

A second embodiment of the present invention will be described with reference to FIGS. 6 to 8. An apparatus according to the second embodiment can be realized by adding an atmospheric temperature sensor for detecting an atmospheric temperature T to the hardware configuration shown in FIG. 1 and letting the ECU 50 execute the routine shown in FIG. 8 to be described later.

The apparatus according to the second embodiment is the same as that according to the first embodiment in the following point. Specifically, the tank's internal pressure $P_{TNK}$ upon the lapse of the steady-state pressure reaching time $T_{SAT}$ after the introduction of the negative pressure to the fuel tank 10 is started is measured as the convergence value $P_{SAT}$. The decision as to whether or not there is a leak trouble is then made by comparing the convergence value $P_{SAT}$ with the reference pressure $P_{REF}$. The apparatus according to the second embodiment, on the other hand, differs from that according to the first embodiment in the following point. Specifically, for the purpose of simplifying processing, the steady-state pressure reaching time $T_{SAT}$ is set on condition that the fuel tank 10 is empty at all times without taking into consideration the space volume $V_{SP}$ of the fuel tank 10.

The time it takes the tank's internal pressure $P_{TNK}$ to reach the convergence value $P_{SAT}$ is the longest when the fuel tank 10 is empty, that is, the space volume $V_{SP}$ of the fuel tank 10 is the largest. If the steady-state pressure reaching time $T_{SAT}$ is set on condition that the fuel tank 10 is empty, therefore, the steady-state pressure reaching time $T_{SAT}$ can be basically prevented from becoming excessively small relative to the time it takes the tank's internal pressure $P_{TNK}$ to converge.

A characteristic of the electric pump 40 relating to pressure introduction (hereinafter referred to as a "pressure introduction characteristic"), however, changes due to fluctuations in an applied voltage to the electric pump 40, change in the pump itself with time, and the like. If the pressure introduction characteristic of the electric pump 40 changes, the time it takes the tank's internal pressure $P_{TNK}$ to reach the convergence value $P_{SAT}$ after the introduction of negative pressure is started also changes.

Figure 6:
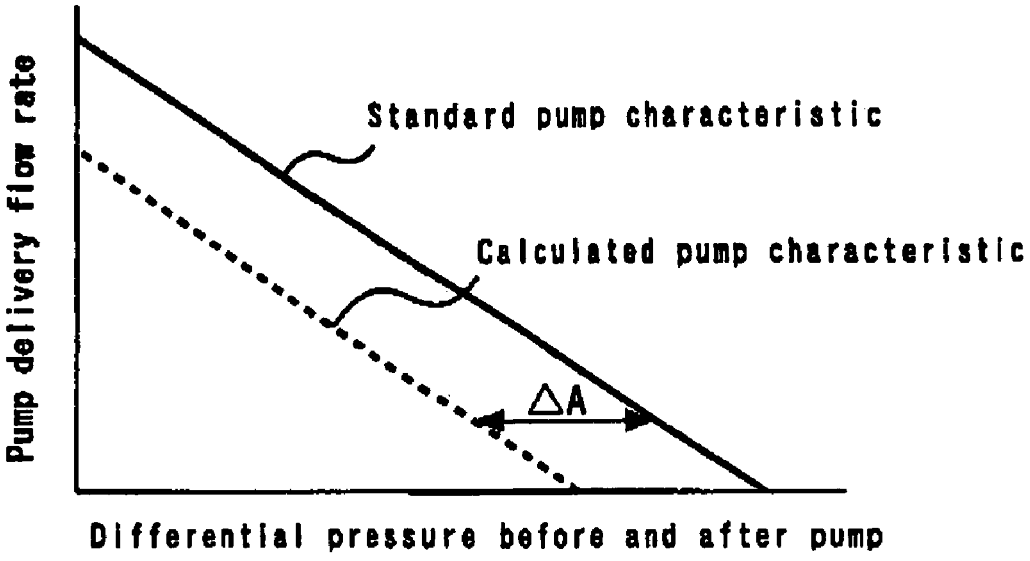
FIG. 6 is a graph for explaining pressure introduction characteristics of an electric pump included in the trouble diagnostics apparatus shown in FIG. 1.

FIG. 6 is a graph for explaining the pressure introduction characteristic of the electric pump 40. The pressure introduction characteristic of the electric pump 40 may be perceived as a relation between a differential pressure produced before and after the electric pump 40 and a delivery flow rate of the electric pump 40. Referring to FIG. 6, the pressure introduction characteristic can be generally perceived that the relation between the differential pressure before and after the electric pump 40 and the delivery flow rate of the electric pump 40 exhibits a linear relation.

The characteristic shown by a solid line in FIG. 6 represents a standard characteristic that realized when a standard applied voltage is supplied to the electric pump 40 in a standard condition. The characteristic shown by a broken line in FIG. 6 represents an example of a deteriorated characteristic that realized when the voltage applied to the electric pump 40 drops below a standard value. Assuming that an electric pump 40 exhibiting the standard characteristic and an electric pump 40 exhibiting the deteriorated characteristic are used under the same environment, the electric pump 40 exhibiting the standard characteristic naturally produces a greater flow rate of delivery than the electric pump 40 exhibiting the deteriorated characteristic. As a result, the steady-state pressure reaching time $T_{SAT}$ for the electric pump 40 exhibiting the deteriorated characteristic becomes naturally greater than the steady-state pressure reaching time $T_{SAT}$ for the electric pump 40 exhibiting the standard characteristic (herein referred to as a "reference steady-state pressure reaching time $T_{SAT}$"). If the reference steady-state pressure reaching time $T_{SAT}$ is set while assuming that the electric motor 40 exhibits the standard characteristic, therefore, that particular setting value is excessively small or undervalued, for the convergence time required under the condition, in which the electric pump 40 exhibits the deteriorated characteristic.

An undervalued amount of the steady-state pressure reaching time $T_{SAT}$, such as that described in the foregoing, correlates with a degree of deviation in the characteristic of the electric pump 40. If the degree of deviation in the characteristic can be detected, therefore, it should be possible to correct the undervalued amount of the steady-state pressure reaching time $T_{SAT}$ based on the detected value representing the degree of deviation in the characteristic. ΔA shown in FIG. 6 is an example of a numerical variable representing the degree of deviation in the characteristic of the electric pump 40. In FIG. 6, difference between differential pressures before and after the electric pump generating the same delivery flow rate is referred to as a "deviation amount ΔA." In the apparatus according to the second embodiment, the deviation amount ΔA can be identified through the following technique.

Specifically, the standard characteristic shown by the solid line in FIG. 6 can be experimentally established in advance. The pressure introduction characteristic of the electric pump 40 is linear as described in the foregoing. If at least one set of the pump delivery flow rate and the differential pressure before and after the pump during operation of the electric pump 40 can be detected, therefore, an actual pressure introduction characteristic of the electric pump 40 (corresponding to the deteriorated characteristic shown by the broken line) can be established based on readings of the set of the pump delivery flow rate and the differential pressure before and after the pump during operation of the electric pump 40.

In the same manner as with the first embodiment, the apparatus according to the second embodiment detects the reference pressure $P_{REF}$ prior to the start of the leak trouble diagnostics procedure. During the process of detecting the reference pressure $P_{REF}$, a condition is created in which the reference pressure $P_{REF}$ and an atmospheric pressure $P_o$ act on both sides of the electric pump 40. In this case, a flow rate $Q_{REF}$ of air flowing through the orifice 42 may be represented as shown below by using a common nozzle equation employing a function F. In an arithmetic expression (1) shown below, A is the cross sectional area of the orifice 42, R is the general gas constant, Ma is the molecular weight of air, and T is the temperature of the upstream side of the orifice 42 (that is, the atmospheric temperature).

$$Q_{REF} = A \cdot \frac{P_0}{\sqrt{R/M_a \cdot T}} \cdot \Phi\left(\frac{P_{REF}}{P_0}\right) \tag{1}$$

During the process of detecting the reference pressure $P_{REF}$, the flow rate $Q_{REF}$ of air flowing through the orifice 42 is directly the delivery flow rate of the electric pump 40. In the apparatus according to the second embodiment, therefore, both the pump delivery flow rate $Q_{REF}$ and the differential pressure before and after the pump ($P_{REF}-P_o$) can be detected by performing a calculation according to the equation (1). When the set of readings is known, the deteriorated characteristic as shown by the broken line in FIG. 6 can be established according to a known linear relation. That is, the pressure introduction characteristic of the electric pump 40 under the actual operating environment can be established. With the deteriorated characteristic of the electric pump 40 established in this manner, the deviation amount ΔA can be found easily by simply calculating the difference between the known standard characteristic and the deteriorated characteristic.

Figure 7:
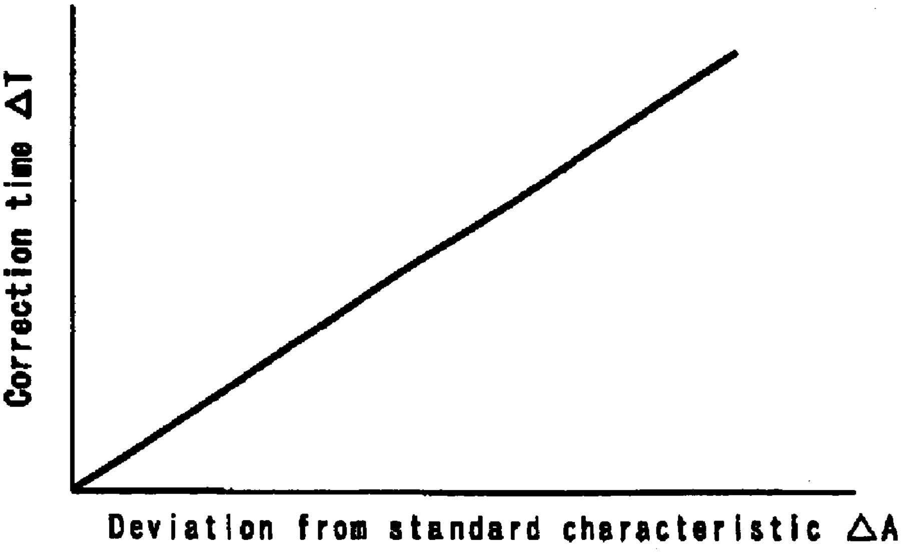
FIG. 7 is a map showing a relation between a difference $\Delta A$ produced in the pressure introduction characteristics of the electric pump and a correction time $\Delta T$ applied to the steady-state pressure reaching time $T_{SAT}$.

FIG. 7 is a map showing a relation between a correction time ΔT for correcting an undervalued amount of the reference steady-state pressure reaching time $T_{SAT}$ and the deviation amount ΔA. As shown in FIG. 7, the correction time ΔT is a value uniquely defined relative to the deviation amount ΔA of the pump characteristic. In accordance with the second embodiment, therefore, the deviation amount ΔA is calculated by using the aforementioned technique immediately after the reference pressure $P_{REF}$ is detected. The correction time ΔT corresponding to the deviation amount ΔA is then calculated. The correction time ΔT is added to the reference steady-state pressure reaching time $T_{SAT}$, thereby finding the steady-state pressure reaching time $T_{SAT}$ after correction that conforms with the actual condition.

[Specific Processing in the Second Embodiment]

Figure 8:
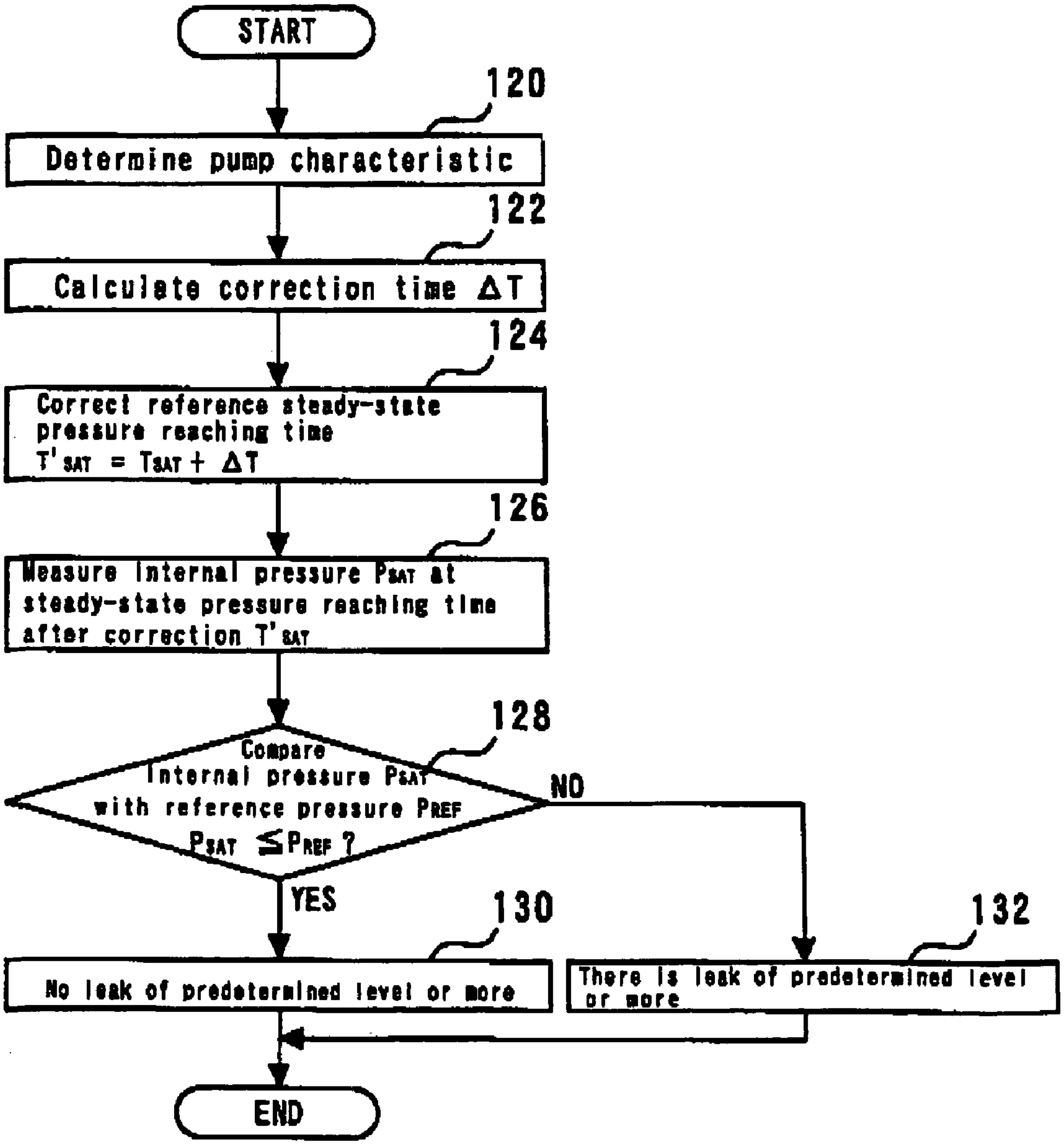
FIG. 8 is a flowchart showing a routine executed in a trouble diagnostics apparatus according to a second embodiment of the present invention.

FIG. 8 is a flowchart showing a routine executed by the ECU 50 according to the second embodiment in order to achieve the aforementioned purposes. Before starting this routine, the atmospheric pressure $P_o$ is detected by the pressure sensor 44 and the reference pressure $P_{REF}$ is detected through the use of the same technique as that used in the first embodiment. In the apparatus according to the second embodiment, the electric pump 40 is started and monitoring of the tank's internal pressure $P_{TNK}$ is started at the same time that the routine is started.

According to the routine shown in FIG. 8, the pressure introduction characteristic of the electric pump 40 is first determined (step 120). In this step, the reference pressure $P_{REF}$, the atmospheric pressure $P_o$, the atmospheric temperature T, and the like are first substituted in the equation (1) cited above. The pump delivery flow rate $Q_{REF}$ is thereby calculated. Next, the combination of the reference pressure $P_{REF}$ and the pump delivery flow rate $Q_{REF}$ detected this time is applied to the known linear relation. This establishes the current pressure introduction characteristic of the electric pump 40 (see the broken line shown in FIG. 6).

The correction time ΔT is next calculated (step 122). Specifically, in this step, the deviation amount ΔA of the pump characteristic as shown in FIG. 6 is calculated. The correction time ΔT corresponding to the deviation amount ΔA is then calculated. The ECU 50 has a map as shown in FIG. 7 stored in memory. The correction time ΔT is determined according to this map.

Next, the correction time ΔT is added to the reference steady-state pressure reaching time $T_{SAT}$ so that a corrected steady-state pressure reaching time $T'_{SAT}$ is calculated (step 124). As described earlier, the reference steady-state pressure reaching time $T_{SAT}$ is the time it takes the tank's internal pressure $P_{TNK}$ to converge when the fuel tank 10 is empty and the electric pump 40 exhibits the standard characteristic. In accordance with the second embodiment, the value of the reference steady-state pressure reaching time $T_{SAT}$ is stored as a fixed value in the ECU 50.

The ECU 50 thereafter waits until the elapsed time after the introduction of the negative pressure reaches the corrected steady-state pressure reaching time $T'_{SAT}$ and then measures the convergence value $P_{SAT}$ of the tank's internal pressure $P_{TNK}$ (step 126). By comparing the convergence value $P_{SAT}$ with the reference pressure $P_{REF}$, the ECU 50 determines whether or not there is a leak trouble (steps 128 to 132). Processing performed through steps 126 to 132 is substantially the same as that performed through steps 104 to 110 shown in FIG. 5.

As explained in the foregoing, the routine shown in FIG. 8 achieves the following purpose. Specifically, the amount of deviation ΔA in the characteristic of the electric pump 40 is incorporated in the corrected steady-state pressure reaching time $T'_{SAT}$ and the decision as to whether or not there is a leak trouble can be made after the lapse of the corrected steady-state pressure reaching time $T'_{SAT}$. According to the apparatus of the second embodiment, therefore, an accurate leak trouble diagnosis can be made. Specifically, even if the pressure introduction characteristic of the electric pump 40 changes due to fluctuations in the applied voltage or the like, the device according to the second embodiment ensures, at all times, a sufficient steady-state pressure reaching time.

THIRD EMBODIMENT

A third embodiment of the present invention will be described with reference to FIG. 9. An apparatus according to the third embodiment can be realized by letting the ECU 50 execute a routine shown in FIG. 9, instead of the routine shown in FIG. 8 described in the foregoing while using the configuration of the second embodiment. In the apparatus according to the second embodiment, the reference steady-state pressure reaching time $T_{SAT}$ is set on condition that the fuel tank 10 is empty. To bring the corrected steady-state pressure reaching time $T'_{SAT}$ into coincidence with the actual convergence time even more accurately, however, it is desirable that the reference steady-state pressure reaching time $T_{SAT}$ be set in consideration of the space volume $V_{SP}$ inside the fuel tank 10 in the same manner as in the first embodiment.

Figure 9:
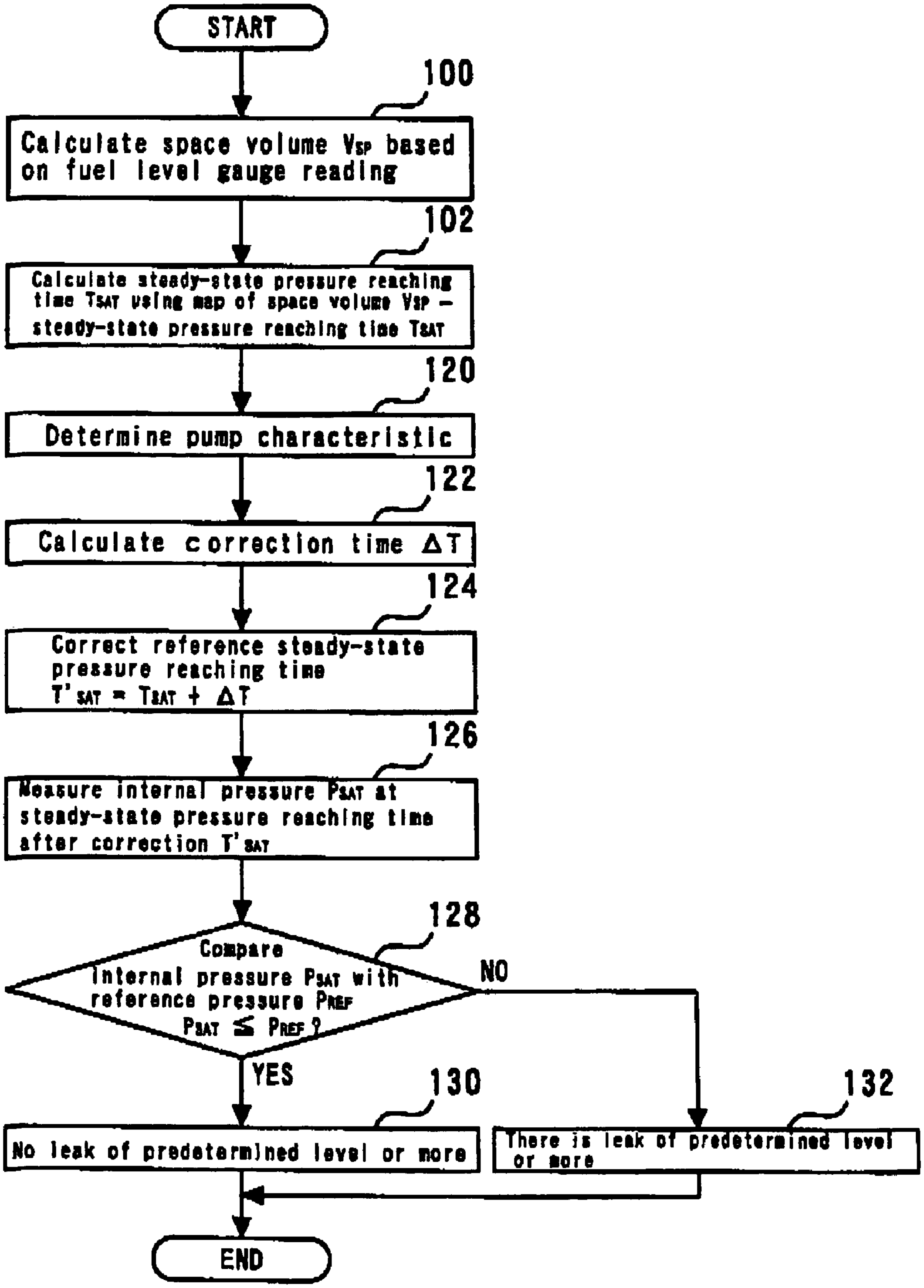
FIG. 9 is a flowchart showing a routine executed in a trouble diagnostics apparatus according to a third embodiment of the present invention.

FIG. 9 is a flowchart showing the routine for achieving the aforementioned purpose. In the routine shown in FIG. 9, steps 100 and 102 are the same as the corresponding steps in the routine shown in FIG. 5. Similarly, steps 120 through 132 are the same as the corresponding steps in the routine shown in FIG. 8. According to the routine shown in FIG. 9, the corrected steady-state pressure reaching time $T'_{SAT}$ can be set such that the $T'_{SAT}$ takes into account both the space volume $V_{SP}$ inside the fuel tank 10 and the pressure introduction characteristic of the electric pump 40. According to the apparatus of the third embodiment, therefore, the effects produced by the apparatus of the first embodiment and the effects produced by the apparatus of the second embodiment can both be realized.

FOURTH EMBODIMENT

A fourth embodiment of the present invention will next be described with reference to FIGS. 10 through 12. An apparatus according to the forth embodiment can be realized by adding an atmospheric temperature sensor for detecting an atmospheric temperature T, a tank temperature sensor for detecting an in-tank temperature $T_{TNK}$, and a fuel temperature sensor for detecting an in-tank fuel temperature T1 to the hardware configuration shown in FIG. 1, and letting the ECU 50 execute routines shown in FIGS. 11 and 12 to be described later.

The above described apparatus according to the first embodiment refers to a map previously defined through an adaptation procedure or the like, thereby setting the steady-state pressure reaching time $T_{SAT}$ that is required for the tank's internal pressure $P_{TNK}$ to reach the convergence value $P_{SAT}$. The apparatus according to the fourth embodiment is, on the other hand, characterized in the following point. Specifically, the device models a phenomenon that occurs inside the fuel tank 10 when negative pressure introduction is carried out by the electric pump 40. The device then uses that model to establish the steady-state pressure reaching time $T_{SAT}$.

Figure 10:
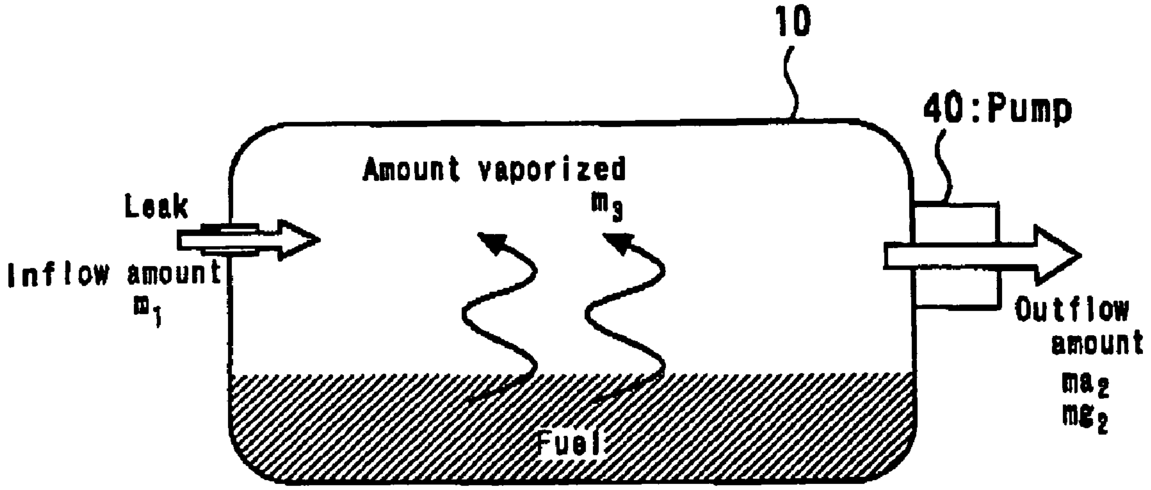
FIG. 10 is a diagram for explaining a physical model used in a trouble diagnostics apparatus according to a fourth embodiment of the present invention.

FIG. 10 is a diagram for explaining the model used in the apparatus according to the fourth embodiment. The model simulates a state in which a gas resident inside the fuel tank 10 is discharged by the electric pump 40. This model also assumes that a leak of the reference hole (a 0.5 mm-diameter hole) is formed in the fuel tank 10.

A gas mixture of air and fuel vapor is present in an area of the space volume $V_{SP}$ inside the fuel tank 10. When the electric pump 40 is operated, the gas mixture is discharged from the fuel tank 10. FIG. 10 shows the amount of air discharged as a result of the operation of the electric pump 40 as $ma_2$ and the amount of fuel vapor discharged as a result of the operation of the electric pump 40 as $mg_2$. When the gas is discharged out of the fuel tank 10, the tank's internal pressure $P_{TNK}$ drops to produce a differential pressure between the inside and outside of the fuel tank 10. This results in air flowing through a portion of the leak trouble into the inside of the tank. FIG. 10 shows the flow rate of air resulting from this air flow as $m_1$. A partial pressure of fuel is maintained at a saturated vapor pressure thereof inside the fuel tank 10. To this end, evaporation of fuel occurs while the gas flows in and out as described in the foregoing, such that the partial pressure of fuel is maintained at the saturated vapor pressure corresponding to the temperature at all times in the fuel tank 10. FIG. 10 shows the resultant amount of fuel evaporated as $m_3$.

The tank's internal pressure $P_{TNK}$ is the sum of the partial pressure of fuel $P_{FUEL}$ and the partial pressure of air $P_{AIR}$ as shown in the equation below.

$$P_{TNK}=P_{FUEL}+P_{AIR} \qquad (2)$$

Based on the premise that the partial pressure of fuel $P_{FUEL}$ is constant, therefore, fluctuations in the tank's internal pressure $P_{TNK}$ occur only from fluctuations in the partial pressure of air $P_{AIR}$. According to the model shown in FIG. 10, the amount of air increased or decreased in the fuel tank 10 can be expressed as "$m_1+ma_2$." When the amount of air increased or decreased is applied to the equation of state of gas regarding air, the relation expressed by the following equation (3) holds true. Where, V in equation (3) is, in this case, the space volume $V_{SP}$ inside the fuel tank 10.

$$\frac{d}{dt}\left(\frac{P_{AIR}}{T_{TNK}}\right)=\frac{R}{V}(m_1+ma_2) \qquad (3)$$

The in-tank temperature $T_{TNK}$ can be regarded as a constant value. Using the aforementioned equation of state of gas (3), therefore, it is possible, given an amount of air inflow $m_1$ and an amount of air outflow $ma_2$, to calculate a fluctuation amount "$dP_{AIR}/dt$" of the partial pressure of air $P_{AIR}$, i.e., a fluctuation amount $\Delta P_{TNK}$ of the tank's internal pressure $P_{TNK}$.

The amount of air inflow $m_1$ refers to the amount of air flowing in a space of the tank's internal pressure $P_{TNK}$ from a space of the atmospheric pressure Po through the reference hole. The amount of air inflow $m_1$ can be represented as shown below by using a nozzle equation employing a function F. In equation (4), A is the cross sectional area of the reference hole, R is the general gas constant, Ma is the molecular weight of air, and T is the temperature on the upstream side of the reference hole (that is, the atmospheric temperature).

$$m_1 = A \cdot \frac{P_0}{\sqrt{R/M_a \cdot T}} \cdot \Phi\left(\frac{P_{TNK}}{P_0}\right) \tag{4}$$

The right-hand side of equation (4) includes known or detectable values, except for the tank's internal pressure $P_{TNK}$. The amount of air inflow $m_1$ can therefore be calculated using equation (4), if the tank's internal pressure $P_{TNK}$ is known.

In the model shown in FIG. 10, the total amount of gas discharged from the electric pump 40 may be represented by "$ma_2+mg_2$." The delivery flow rate of the electric pump 40 ($ma_2+mg_2$), on the other hand, exhibits the linear relation with respect to the differential pressure acting on both sides of the electric pump 40 (in this case, $P_{TNK}-P_o$), as explained earlier (see FIG. 6). The linear relation between the delivery flow rate of the pump ($ma_2+mg_2$) and the differential pressure ($P_{TNK}-P_o$) can be represented in advance by a mathematical expression as shown below through an adaptation procedure or the like. In equation (5), B and C are coefficients of adaptation.

$$ma_2+mg_2=B\cdot(P_{TNK}-P_o)+C \tag{5}$$

The ratio of the amount of air discharged $ma_2$ from the electric pump 40 to the amount of fuel vapor $mg_2$ discharged therefrom can be regarded as being equal to a mass fraction "a" of air inside of the fuel tank 10. The mass fraction "a" can be represented by the following equation (6).

$$\begin{aligned} a &= \frac{P_{AIR}\cdot M_a}{P_{FUEL}\cdot Mg + P_{AIR}\cdot M_g} \\ &= \frac{(P_{TNK}-P_{FUEL})\cdot M_a}{P_{FUEL}\cdot Mg + (P_{TNK}-P_{FUEL})\cdot Mg} \end{aligned} \tag{6}$$

Further, a partial pressure of fuel vapor $P_{FUEL}$ contained in equation (6) can be regarded as the saturated vapor pressure determined by the fuel temperature T1. The partial pressure of fuel vapor $P_{FUEL}$ can therefore be obtained by using the following equation (7). In equation (7), RVP (read vapor pressure) is a coefficient indicating the ease with which the fuel vaporizes.

$$P_{FUEL} = 10^{\left(6.15-\frac{311\times(6.15-\log_{10}(RVP))}{T_1}\right)} \tag{7}$$

According to the relation as expressed in equations (6) and (7) above, the mass fraction "a" of air can be calculated if the tank's internal pressure $P_{TNK}$ is known. Once the mass fraction "a" of air is known, then the amount of air discharged $ma_2$ from the electric pump 40 can be calculated as follows by using the relation as expressed in equation (5).

$$\begin{aligned} ma_2 &= (ma_2+mg_2)\cdot a \\ &= \{B\cdot(P_{TNK}-P_o)+C\}\cdot a \end{aligned} \tag{8}$$

To state it another way, like the amount of air inflow $m_1$, the amount of air discharged $ma_2$ from the electric pump 40 can be calculated as long as the tank's internal pressure $P_{TNK}$ is known.

The model shown in FIG. 10 assumes that the electric pump 40 is started under the condition that the tank's internal pressure $P_{TNK}$ converges on the atmospheric pressure $P_o$. The initial value of the tank's internal pressure $P_{TNK}$ can therefore be treated as the atmospheric pressure $P_o$. If the aforementioned calculation is performed with the tank's internal pressure $P_{TNK}$ being the atmospheric pressure $P_o$, the amount of air inflow $m_1$ and the amount of air discharged $ma_2$ occurring immediately after the electric pump 40 is started can be calculated.

By applying the $m_1$ and $ma_2$ values obtained through the aforementioned calculation procedure to the equation of state (3), it is possible to find the fluctuation amount $\Delta P_{TNK}$ of the tank's internal pressure $P_{TNK}$ produced from $m_1$ and $ma_2$. Then, subtracting the fluctuation amount. $\Delta P_{TNK}$ from the atmospheric pressure $P_o$ yields a changed tank's internal pressure $P_{TNK}$ ($P_{TNK}=P_o-\Delta P_{TNK}$). Hereafter, the processing for calculating the amount of air inflow $m_1$ and the amount of air discharged $ma_2$, and the processing for calculating the changed tank's internal pressure using the $m_1$ and $ma_2$ values thus obtained are repeatedly carried out. The changes in the tank's internal pressure $P_{TNK}$ after the electric pump 40 is started can thereby be simulated.

Figure 11:
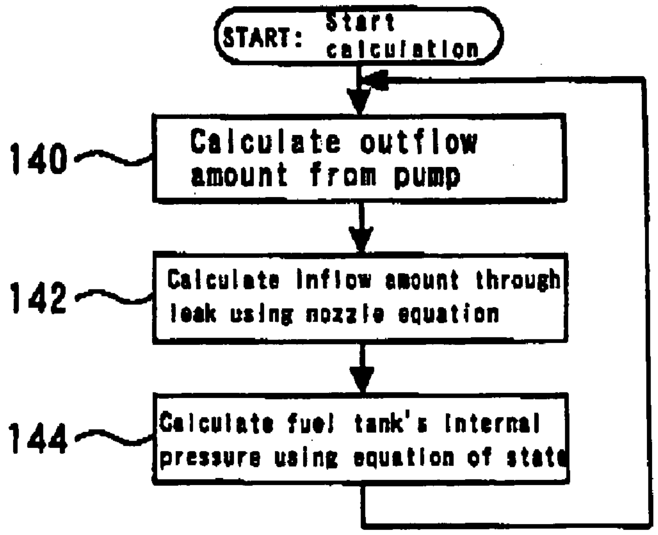
FIG. 11 is a flowchart showing a routine executed to calculate the tank's internal pressure $P_{TNK}$ using the physical model in the trouble diagnostics apparatus according to the fourth embodiment of the present invention.

FIG. 11 is a flowchart showing a routine executed by the ECU 50 of the fourth embodiment in order to simulate changes in the tank's internal pressure $P_{TNK}$ according to the aforementioned technique. In this routine, the amount of air $ma_2$ discharged from the fuel tank 10 by the electric pump 40 is first calculated (step 140; see equations (6) through (8)). Then, using nozzle equation (4), the amount of air $m_1$ flowing in through the virtual reference hole is calculated (step 142). These calculated $ma_2$ and $m_1$ values are then applied to the equation of state (3) so that the changed tank's internal pressure $P_{TNK}$ is obtained (step 144). These calculation procedures are repeated hereafter until the value calculated as the tank's internal pressure $P_{TNK}$ converges on a steady-state value.

The changes in the tank's internal pressure $P_{TNK}$ in the period after the electric pump 40 is started can now be simulated through the processing shown in FIG. 11. It then becomes possible, in a simulated manner, to detect the time it takes the tank's internal pressure $P_{TNK}$ to reach the convergence value, namely the steady-state pressure reaching time $T_{SAT}$. Whether the calculated value of tank's internal pressure $P_{TNK}$ has converged or not may be determined by, for example, determining whether or not the rate of change of the tank's internal pressure $P_{TNK}$ calculated at each cycle of the routine shown in FIG. 11 becomes smaller than a predetermined criterion value.

Figure 12:
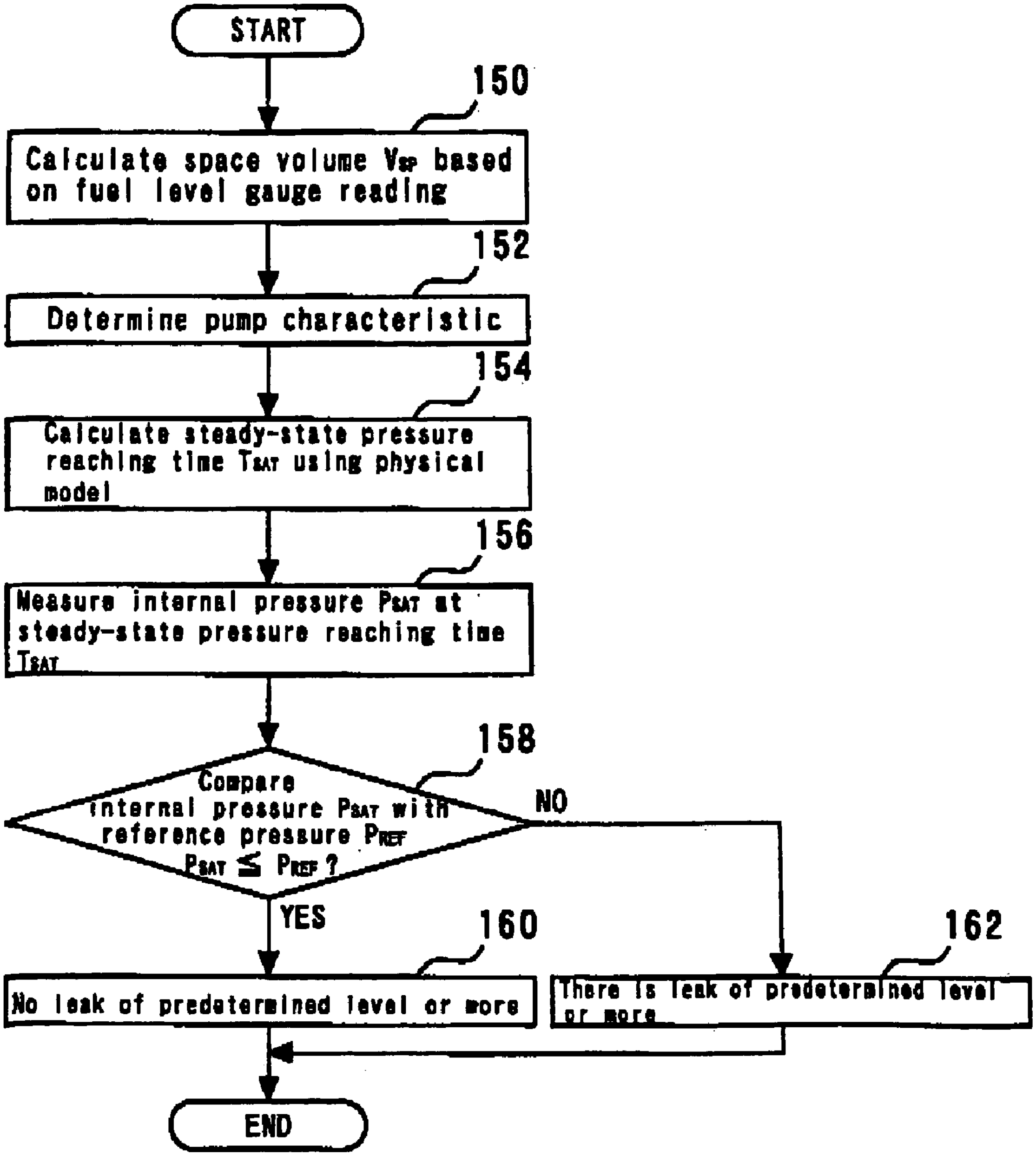
FIG. 12 is a flowchart showing a routine executed to diagnose a leak trouble in the trouble diagnostics apparatus according to the fourth embodiment of the present invention.

FIG. 12 is a flowchart showing a routine executed by the ECU 50 to diagnose a leak trouble after the lapse of the steady-state pressure reaching time $T_{SAT}$ set through the above technique. This routine is to be executed after the following events. The events are specifically that the pressure sensor 44 detects the atmospheric pressure $P_o$ and that the reference pressure $P_{REF}$ is detected through the same technique as that used in the first embodiment. In the apparatus according to the fourth embodiment, the operation of the electric pump 40 is started and monitoring of the tank's internal pressure $P_{TNK}$ is started at the same time that the routine is started.

In the routine shown in FIG. 12, the space volume $V_{SP}$ inside the fuel tank 10 is fist calculated based on the remaining amount of fuel indicated by the fuel level gauge 12 (step 150). The space volume $V_{SP}$ calculated at this step is used for "V" in the equation of state (3) when the steady-state pressure reaching time $T_{SAT}$ is later calculated.

The pressure introduction characteristic of the electric pump 40 is then determined (step 152). Specifically, through the same technique as that used in step 120, the relation between the differential pressure acting on the electric pump 40 and the pump delivery flow rate, that is, the relation of equation (5) is obtained.

Then, using the physical model (the model shown in FIG. 10), the steady-state pressure reaching time $T_{SAT}$ is set according to the procedures described earlier (step 154). Specifically, the routine shown in FIG. 11 is repeated until the calculated value of the tank's internal pressure $P_{TNK}$ converges. Based on the changes in the tank's internal pressure $P_{TNK}$ thus obtained, the steady-state pressure reaching time $T_{SAT}$, or the time it takes the tank's internal pressure $P_{TNK}$ to converge, is obtained through calculation.

The ECU 50, thereafter, waits for the elapsed time after the introduction of negative pressure to reach the steady-state pressure aching time $T_{SAT}$. Then, as the steady-state pressure reaching time $T_{SAT}$ arrives, the ECU 50 measures the convergence value $P_{SAT}$ of the tank's internal pressure $P_{TNK}$ (step 156). By comparing the convergence value $P_{SAT}$ with the reference pressure $P_{REF}$, the ECU 50 determines whether or not there is a leak trouble (steps 158 to 162). The processing performed in steps 156 through 162 is substantially the same as that performed in steps 104 through 110 shown in FIG. 5.

As described in the foregoing, according to the routine shown in FIG. 12, the steady-state pressure reaching time $T_{SAT}$ can be obtained through calculation using the physical model shown in FIG. 10. The space volume $V_{SP}$ inside the fuel tank 10 and the pressure introduction characteristic of the electric pump 40 are incorporated in this calculation. According to the apparatus of the fourth embodiment, therefore, the following purpose can be achieved. Specifically, the steady-state pressure reaching time $T_{SAT}$, neither too much nor too little, is calculated highly accurately through the calculation that uses the physical model. The device thus realizes an accurate leak trouble diagnostic.

FIFTH EMBODIMENT

A fifth embodiment of the present invention will next be described with reference to FIGS. 13 and 14. An apparatus according to the fifth embodiment can be realized, in the hardware configuration as sown in FIG. 1, by letting the ECU 50 execute the routine shown in FIG. 14 to be described later.

In the same manner as in the first embodiment, the trouble diagnostics apparatus according to the fifth embodiment of the present invention diagnoses a possible leak therein by the following procedure. Specifically, the device uses the electric pump 40 to introduce a negative pressure into the fuel tank 10. The device then compares the tanks internal pressure $P_{TNK}$ that is estimated to be the convergence value $P_{SAT}$ with the reference pressure $P_{REF}$. In diagnosing a leak trouble through these procedures, the apparatus according to any one of the first through third embodiments is to determine whether or not the tank's internal pressure $P_{TNK}$ has converged upon the lapse of the preset steady-state pressure reaching time $T_{SAT}$. On the other hand, the apparatus according to the fifth embodiment is characterized in that the approach explained hereunder is taken to determine whether or not the tank's internal pressure $P_{TNK}$ has converged.

Figure 13:
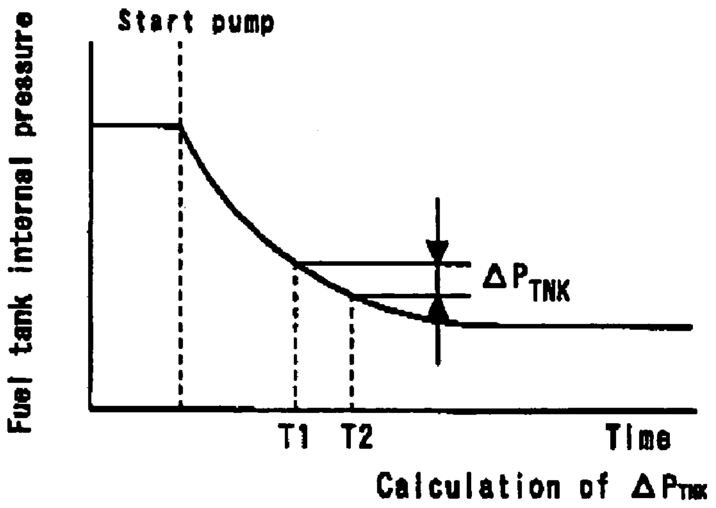
FIG. 13 is a diagram for explaining changes in the tank's internal pressure $P_{TNK}$ in the course of the pressure's reaching the convergence value in the trouble diagnostics apparatus shown in FIG. 1.

FIG. 13 shows changes in the tank's internal pressure $P_{TNK}$ during the course after the introduction of the negative pressure by the electric pump 40 is started. As shown in FIG. 13, the fluctuation amount $\Delta P_{TNK}$ of the tank's internal pressure $P_{TNK}$ per unit time exhibits the following trend. The trend is, specifically, the closer the tank's internal pressure $P_{TNK}$ approaches the convergence value, the smaller the fluctuation amount $\Delta P_{TNK}$. Accordingly, when the fluctuation amount $\Delta P_{TNK}$ becomes a sufficiently small value, it can be determined that the tank's internal pressure $P_{TNK}$ has approached near the convergence value. The apparatus according to the fifth embodiment therefore takes the following approach. Specifically, the device monitors the fluctuation amount (derivative value) $\Delta P_{TNK}$ of the tank's internal pressure $P_{TNK}$ on a real-time basis after the introduction of negative pressure is started. When the fluctuation amount $\Delta P_{TNK}$ is below a criterion value, the device determines that the tank's internal pressure $P_{TNK}$ has converged, then performing the leak diagnosis.

Figure 14:
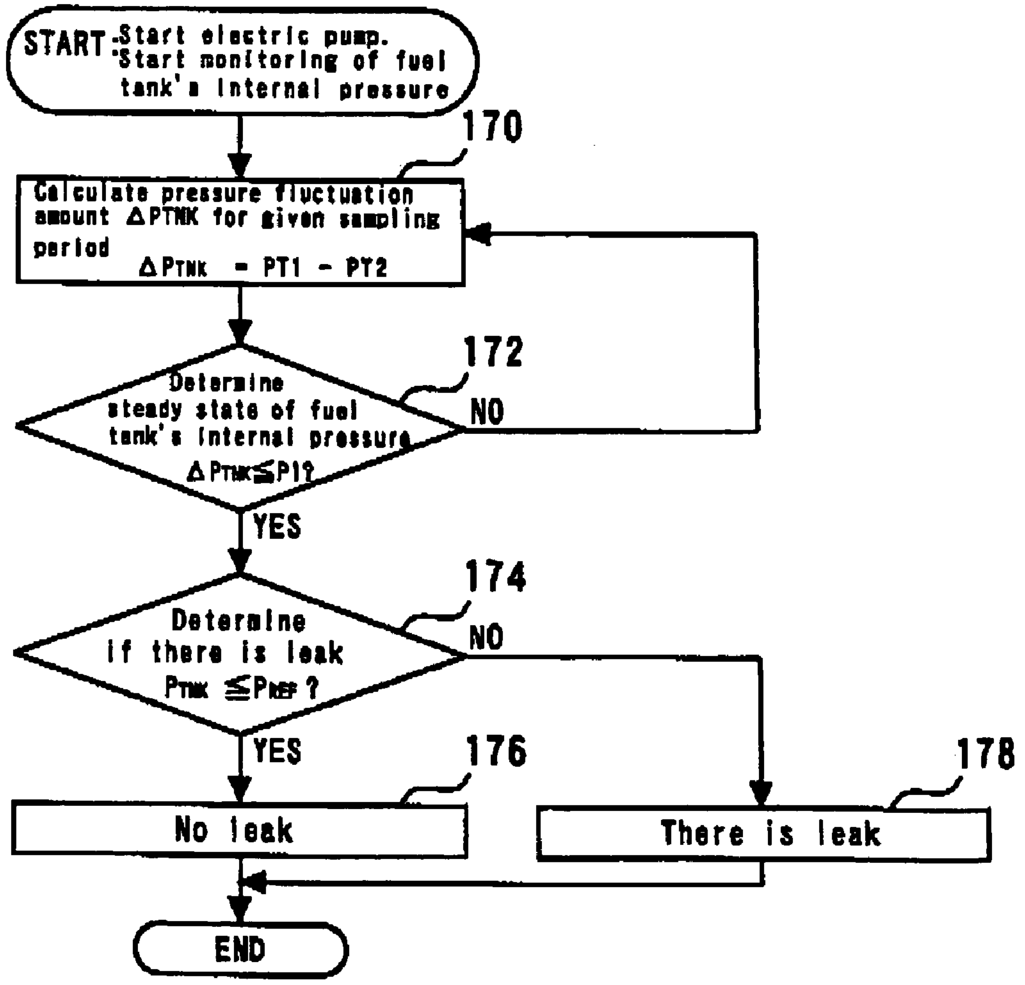
FIG. 14 is a flowchart showing a routine executed in the trouble diagnostics apparatus according to the fifth embodiment of the present invention.

FIG. 14 is a flowchart showing a routine executed in the apparatus according to the fifth embodiment to achieve the aforementioned purposes. This routine is executed after the reference pressure $P_{REF}$ is detected by taking the same approach as that for the first embodiment. In the apparatus according to the fifth embodiment, the operation of the electric pump 40 is started and monitoring of the tank's internal pressure $P_{TNK}$ is started at the same time that the routine is started.

In the routine shown in FIG. 14, the fluctuation amount $\Delta P_{TNK}$ of the tank's internal pressure $P_{TNK}$ at a current sampling time $T_2$ is first calculated (step 170). The fluctuation amount $\Delta P_{TNK}$ is calculated as follows. Specifically, a tank's internal pressure $P_{T2}$ at the current sampling time $T_2$ is subtracted from a tank's internal pressure $P_{T1}$ at a preceding sampling time $T_1$ ($\Delta P_{TNK}=P_{T1}-P_{T2}$). In this step, the tank's internal pressure $P_{TNK}$ ($P_{T1}$, $P_{T2}$) is a value detected by the tank's internal pressure sensor 14.

It is next determined whether or not the fluctuation amount $\Delta P_{TNK}$ obtained is a criterion value P1 or less (step 172). If it is determined that $\Delta P_{TNK} \leqq$ P1 does not hold true, it can then be determined that there is still a sharp drop in the tank's internal pressure $P_{TNK}$, or the tank's internal pressure $P_{TNK}$ is not yet to converge. In this case, the processing of step 170 is executed again.

If it is determined in step 172 that $\Delta P_{TNK} \leqq$ P1 holds true, it can then be determined that the tank's internal pressure $P_{TNK}$ has already converged. In this case, the ECU 50 determines whether or not there is a leak trouble based on the comparison made between the tank's internal pressure $P_{TNK}$ and the reference pressure $P_{REF}$ at that particular point in time (steps 174 to 178). According to the processing described in the foregoing, it is possible to determine whether or not there is a leak trouble at an appropriate timing by estimating convergence of the tank's internal pressure $P_{TNK}$ based on a behavior thereof after the introduction of negative pressure is started by the electric pump 40.

According to the fifth embodiment as described in the foregoing, the tank's internal pressure $P_{TNK}$ is detected by the tank's internal pressure sensor 14. The method of acquiring the tank's internal pressure $P_{TNK}$ data is not limited to this approach. For example, the pressure sensor 44 included in the pump module 30 may be used to detect the tank's internal pressure $P_{TNK}$. Still another way is possible for detecting the tank's internal pressure $P_{TNK}$. Specifically, after the electric pump 40 is started, the physical model as shown in FIG. 10 is used in the same manner as in the fourth embodiment. To state it another way, the tank's internal pressure $P_{TNK}$ may be obtained through calculation according to the routine (arithmetic expressions (3) to (8)) shown in FIG. 11.

Aspects of the present invention described above and the major benefits thereof are summarized as follows:

A first aspect of the present invention relates to a trouble diagnostics apparatus for a fuel treatment system. The apparatus includes a fuel tank; a pressure introduction mechanism for introducing a positive pressure or a negative pressure to the fuel tank; a convergence value detection device for detecting, as a convergence value, a tank's internal pressure at a time upon which a steady-state pressure reaching time elapses after introduction of the positive pressure or negative pressure is started; a leak trouble determination device for determining, based on the convergence value, whether or not there is a leak occurring in a system including the fuel tank; a space volume detection device for detecting a space volume of the system including the fuel tank; and a steady-state pressure reaching time setting device for setting the steady-state pressure reaching time based on the space volume.

A second aspect of the present invention relates to a trouble diagnostics apparatus for a fuel treatment system. The apparatus includes a fuel tank; a pressure introduction mechanism for introducing a positive pressure or a negative pressure to the fuel tank; a convergence value detection device for detecting, as a convergence value, a tank's internal pressure at a time upon which a steady-state pressure reaching time elapses after introduction of the positive pressure or negative pressure is started; a leak trouble determination device for determining based on the convergence value, whether or not there is a leak occurring in a system including the fuel tank; a characteristic detection device for detecting a pressure introduction characteristic of the pressure introduction mechanism; and a steady-state pressure reaching time setting device for setting the steady-state pressure reaching time based on the pressure introduction characteristic detected.

A third aspect of the present invention relates to the trouble diagnostics apparatus according to the second aspect. In this apparatus, the steady-state pressure reaching time setting device includes reference steady-state pressure reaching time setting device for setting a reference steady-state pressure reaching time on the premise that the pressure introduction characteristic exhibits a standard pressure introduction characteristic; a characteristic difference detection device for detecting a characteristic difference between the pressure introduction characteristic detected and the standard pressure introduction characteristic; and a steady-state pressure reaching time correction device for calculating the steady-state pressure reaching time by correcting the reference steady-state pressure reaching time based on the characteristic difference.

A fourth aspect of the present invention relates to the trouble diagnostics apparatus according to the second aspect. In this apparatus, the reference steady-state pressure reaching time setting device includes space volume detection device for detecting a space volume of the system including the fuel tank and, based on the space volume, sets the reference steady-state pressure reaching time.

A fifth aspect of the present invention relates to a trouble diagnostics apparatus for a fuel treatment system. The apparatus includes a fuel tank; a pressure introduction mechanism for introducing a positive pressure or a negative pressure to the fuel tank; a convergence value detection device for detecting, as a convergence value, a tank's internal pressure at a time upon which a steady-state pressure reaching time elapses after introduction of the positive pressure of negative pressure is started; a leak trouble determination device for determining based on the convergence value, whether or not there is a leak occurring in a system including the fuel tank; an amount of air transferred estimation device for estimating an amount of air that is assumed to be transferred between the pressure introduction mechanism and the fuel tank as the pressure introduction mechanism is operated; an amount of air leaked estimation device for estimating an amount of air that is assumed to be leaked through the reference hole while the pressure introduction mechanism is operated in a case where there is a reference hole in the fuel tank,; an amount of air increased or decreased estimation device for estimating an amount of air that is assumed to be increased or decreased in the fuel tank based on the amount of air transferred and the amount of air leaked a tank's internal pressure fluctuation amount calculation device for estimating a tank's internal pressure fluctuation amount corresponding to the amount of air increased or decreased according to a relation of an equation of state of gas; a pressure change estimation device for estimating changes in tank's internal pressure that are assumed to be made after an operation of the pressure introduction mechanism is started based on the tank's internal pressure fluctuation amount; and a steady-state pressure reaching time setting device for setting the steady-state pressure reaching time based on the changes in tank's internal pressure estimated.

A sixth aspect of the present invention relates to the trouble diagnostics apparatus according to the fifth aspect. In this apparatus, the amount of air transferred estimation device includes differential pressure calculation device for calculating a differential pressure acting on both sides of the pressure introduction mechanism based on the tank's internal pressure estimated by the pressure change estimation device; a total gas flow rate calculation device for calculating a total flow rate of gas to be circulated through the pressure introduction mechanism for the differential pressure estimated; and a mass fraction calculation device for calculating a mass fraction of air in the fuel tank. The amount of air transferred estimation device calculates the amount of air transferred to be generated for the differential pressure based on the total gas flow rate and the mass fraction. The amount of air leaked estimation device calculates the amount of air leaked based on an atmospheric pressure and the tank's internal pressure estimated by the pressure change estimation device.

A seventh aspect of the present invention relates to a trouble diagnostics apparatus for a fuel treatment system. The apparatus includes a fuel tank; a pressure introduction mechanism for introducing a positive pressure or a negative pressure to the fuel tank; amount of pressure change detection device for detecting an amount of change in the tank's internal pressure per unit time after introduction of the positive pressure or negative pressure is started; a convergence value detection device for detecting, as a convergence value, the tank's internal pressure at a time point when the amount of change in the tank's internal pressure per unit time becomes a criterion value or less; and a leak trouble determination device for determining whether or not there is a leak in a system including the fuel tank baaed on the convergence value.

An eighth aspect of the present invention relates to the trouble diagnostics apparatus according to the seventh aspect. In this apparatus, the amount of pressure change detection device includes amount of air transferred estimation device for estimating an amount of air transferred between the pressure introduction mechanism and the fuel tank during operation of the pressure introduction mechanism; an amount of air leaked estimation device for estimating an amount of air that is assumed to be leaked through the reference hole while the pressure introduction mechanism is operated in a case where there is a reference hole in the fuel tank,; an amount of air increased or decreased estimation device for estimating an amount of air increased or decreased in the fuel tank based on the amount of air transferred and the amount of air leaked; and a tank's internal pressure fluctuation amount calculation device for estimating a tanks internal pressure fluctuation amount corresponding to the amount of air increased or decreased according to a relation of an equation of state of gas. The amount of pressure change detection device detects the amount of change in the tank's internal pressure per unit time based on the tank's internal pressure fluctuation amount.

A ninth aspect of the present invention relates to the trouble diagnostics apparatus according to the eighth aspect. In this apparatus, the amount of air transferred estimation device includess pressure estimation device for estimating tank's internal pressure that are assumed to be made after an operation of the pressure introduction mechanism is started based on the tank's internal pressure fluctuation amount; a differential pressure calculation device for calculating a differential pressure acting on both sides of the pressure introduction mechanism based on the tank's internal pressure estimated by the pressure estimation device; a total gas flow rate calculation device for calculating a total flow rate of gas to be circulated through the pressure introduction mechanism for the differential pressure estimated; and a mass fraction calculation device for calculating a mass fraction of air in the fuel tank. The amount of air transferred estimation device calculates the amount of air transferred to be generated for the differential pressure based on the total gas flow rate and the mass fraction. The amount of air leaked estimation device calculates the amount of air leaked based on an atmospheric pressure and the tank's internal pressure estimated by the pressure estimation device.

According to the first aspect of the present invention, the steady-state pressure reaching time is set based on the space volume of the fuel tank. It is determined whether or not there is a leak in the system including the fuel tank only when the steady-state pressure reaching time elapses. The invention thus allows a decision to be made as to whether or not there is a leak trouble at an appropriate timing, at which the tank's internal pressure reaches the convergence value.

According to the second aspect of the present invention, the steady-state pressure reaching time is set based on the pressure introduction characteristics of the pressure introduction mechanism. It is determined whether or not there is a leak in the system including the fuel tank only when the steady-state pressure reaching time elapses. The invention thus allows a decision to be made as to whether or not there is a leak trouble at an appropriate timing, at which the tank's internal pressure reaches the convergence value, without being affected by variations in characteristics of the pressure introduction mechanism.

According to the third aspect of the present invention, the steady-state pressure reaching time can be calculated properly through simple processing by incorporating the degree of deviation of the pressure introduction characteristics of the pressure introduction mechanism from the reference characteristics in the reference steady-state pressure reaching time.

According to the fourth aspect of the present invention, the steady-state pressure reaching time can be set based on both the pressure introduction characteristics of the pressure: introduction mechanism and the space volume of the fuel tank. The invention thus allows a decision to be made as to whether or not there is a leak trouble at an extremely appropriate timing, at which the tank's internal pressure reaches the convergence value.

According to the fifth aspect of the present invention, the amount of air to be transferred that is assumed to be transferred by the pressure introduction mechanism and the amount of air to leak that is assumed to leak through the virtual reference hole are estimated. According to the fifth aspect of the present invention, it is then possible to estimate, based on these estimated values, the amount of air to be increased or decreased that is assumed to be produced in the fuel tank in case the reference hole exists. The amount of change in the tank's internal pressure can be estimated by applying the amount of air to be increased or decreased to the equation of state of gas. The amount of change is then added up to estimate the change in the tank's internal pressure. The invention thus allows the steady-state pressure reaching time of the tank's internal pressure to be set through calculation based on the change in the tank's internal pressure estimated as described in the foregoing.

According to the sixth aspect of the present invention, the differential pressures acting on both sides of the pressure introduction mechanism is calculated based on the estimated tank's internal pressure. The total flow rate of gas circulating through the pressure introduction mechanism can then be calculated based on the differential pressures. The amount of air to be transferred by the pressure introduction mechanism can be obtained through calculation, in which the total gas flow rate is multiplied by mass fraction. In addition, according to the sixth aspect of the present invention, the amount of air to leak circulating through the virtual reference hole can also be obtained through calculation based on the estimated tank's internal pressure value and atmospheric pressure.

According to the seventh aspect of the present invention, it can be determined that the tank's internal pressure has reached the convergence value when the amount of change in the tank's internal pressure per unit time becomes a criterion value or less. According to this approach, a leak trouble diagnosis can be made at an appropriate timing through extremely simple processing.

According to the eighth aspect of the present invention, the amount of change in the tank's internal pressure per unit time that is assumed to be produced during the operation of the pressure introduction mechanism can be obtained through calculation on the assumption that there is a virtual reference hole in the fuel tank. When the amount of change in the tank's internal pressure per unit time becomes a criterion value or less, it is determined that the tank's internal pressure has reached the convergence value. It can thereby be determined whether or not there is a leak trouble.

According to the ninth aspect of the present invention, in the same way as in the sixth aspect of the present invention, the amount of air to be transferred by the pressure introduction mechanism and the amount of air to leak circulating through the virtual reference hole can both be obtained through calculation.

In the first embodiment of the present invention described in the foregoing, the electric pump 40 corresponds to the "pressure introduction mechanism" in the first aspect of the present invention. Similarly, the "convergence value detection device" in the first aspect of the present invention is realized by the ECU 50 executing the processing of step 104. The "leak trouble determination device" in the first aspect of the present invention is realized by the ECU 50 executing the processing of steps 106 to 110. The "space volume detection device" in the first aspect of the present invention is realized by the ECU 50 executing the processing of step 100. The "steady-state pressure reaching time setting device" in the first aspect of the present invention is realized by the ECU 50 executing the processing of step 102.

In the second embodiment of the present invention described in the foregoing, the electric pump 40 corresponds to the "pressure introduction mechanism" in the second aspect of the present invention. Similarly, the "convergence value detection device" in the second aspect of the present invention is realized by the ECU 50 executing the processing of step 126. The "leak trouble determination device" in the second aspect of the present invention is realized by the ECU 50 executing the processing of steps 128 to 132. The "characteristic detection device" in the second aspect of the present invention is realized by the ECU 50 executing the processing of step 120. The "steady-state pressure reaching time setting device" in the second aspect of the present invention is realized by the ECU 50 executing the processing of steps 122 and 124.

In the second embodiment of the present invention described in the foregoing, the "reference steady-state pressure reaching time setting device" in the third aspect of the present invention is realized by the ECU 50 reading the reference steady-state pressure reaching time $T_{SAT}$. The "characteristics difference detection device" in the third aspect of the present invention is realized by the ECU 50 finding the deviation amount ΔA. The "steady-state pressure reaching time cohesion device" in the third aspect of the present invention is realized by the ECU 50 executing the processing of step 124.

In the trouble diagnostics apparatus according to the third embodiment of the present invention described in the foregoing, the "reference steady-state pressure reaching time setting device" in the fourth aspect of the present invention is realized by the ECU 50 executing the processing of steps 100 and 102 shown in FIG. 9. Further, the "space volume detection device" in the fourth aspect of the present invention is realized by the ECU 50 executing the processing of step 100 shown in FIG. 9.

In the fourth embodiment of the present invention described in the foregoing, the electric pump 40 corresponds to the "pressure introduction mechanism" in the fifth aspect of the present invention. Similarly, the "convergence value detection device" in the fifth aspect of the present invention is realized by the ECU 50 executing the processing of step 156. The "leak trouble determination device" in the fifth aspect of the present invention is realized by the ECU 50 executing the processing of steps 158 to 162. The "amount of air transferred estimation device" in the fifth aspect of the present invention is realized by the ECU 50 executing the processing of step 140. The "amount of air leaked estimation device" in the fifth aspect of the present invention is realized by the ECU 50 executing the processing of step 142. The "amount of air increased or decreased estimation device," the "amount of tank's internal pressure changed calculation device," and the "pressure change estimation device" in the fifth aspect of the present invention is realized by the ECU 50 executing the processing of step 144. The "steady-state pressure reaching time setting device" in the fifth aspect of the present invention is realized by the ECU 50 executing the processing of step 154.

In addition, according to the trouble diagnostics apparatus according to the fourth embodiment of the present invention, the "differential pressure calculation device" and the "total gas flow rate calculation device" in the sixth aspect of the present invention is realized by the ECU 50 executing the calculation of equation (5). Similarly, the "mass fraction calculation device" in the sixth aspect of the present invention is realized by the ECU 50 executing the calculation of equation (6). The "calculation" of the amount of air transferred in the sixth aspect of the present invention is realized by the ECU 50 executing the calculation of equation (8). The "calculation" of the amount of air leaked in the sixth aspect of the present invention is realized by the ECU 50 executing the calculation of equation (4).

In the fifth embodiment of the present invention described in the foregoing, the electric pump 40 corresponds to the "pressure introduction mechanism" in the seventh aspect of the present invention. Similarly, the "pressure fluctuation amount detection device" in the seventh aspect of the present invention is realized by the ECU 50 executing the processing of step 170. The "convergence value detection device" in the seventh aspect of the present invention is realized by the ECU 50 executing the processing of step 172. The "leak trouble determination device" in the seventh aspect of the present invention is realized by the ECU 50 executing the processing of steps 174 to 178.

In the fifth embodiment of the present invention described in the foregoing, the following device in the eighth aspect of the present invention are realized by letting the ECU 50 calculate the tank's internal pressure $P_{TNK}$ according to the physical model shown in FIG. 10. The device are specifically: the "amount of air transferred estimation device," the "amount of air leaked estimation device," the "amount of air increased or decreased," the "tank's internal pressure fluctuation amount calculation device," and the "pressure change estimation device." Furthermore, the "differential pressure calculation device" and the "total gas flow rate calculation device" in the ninth aspect of the present invention are realized by letting the ECU 50 perform equation (5). The "mass fraction calculation device" in the sixth aspect of the present invention is realized by letting the ECU 50 perform equation (6). The "calculation" of the amount of air transferred in the sixth aspect of the present invention is realized by letting the ECU 50 perform the calculation of equation (8). The "calculation" of the amount of air leaked in the sixth aspect of the present invention is realized by letting the ECU 50 execute the calculation of equation (4).

The invention claimed is:

1. A trouble diagnostics apparatus for a fuel treatment system, comprising:

- a fuel tank;
- a pressure introduction mechanism for introducing a positive pressure or a negative pressure to said fuel tank;
- convergence value detection means for detecting, as a convergence value, a tank's internal pressure at a time upon which a steady-state pressure reaching time elapses after introduction of said positive pressure or negative pressure is started;
- leak trouble determination means for determining, based on said convergence value, whether or not there is a leak occurring in a system including said fuel tank;
- space volume detection means for detecting a space volume of said system including the fuel tank; and
- steady-state pressure reaching time setting means for setting said steady-state pressure reaching time based on said space volume.

2. A trouble diagnostics apparatus for a fuel treatment system, comprising:
a fuel tank;
a pressure introduction mechanism for introducing a positive pressure or a negative pressure to said fuel tank;
convergence value detection means for detecting, as a convergence value, a tank's internal pressure at a time upon which a steady-state pressure reaching time elapses after introduction of said positive pressure or negative pressure is started;
leak trouble determination means for determining, based on said convergence value, whether or not there is a leak occurring in a system including said fuel tank;
characteristic detection means for detecting a pressure introduction characteristic of said pressure introduction mechanism; and
steady-state pressure reaching time setting means for setting said steady-state pressure reaching time based on said pressure introduction characteristic detected.

3. The ruble diagnostics apparatus for a fuel treatment system according to claim 2,
wherein said steady-state pressure reaching time setting means comprises:
reference steady-state pressure reaching time setting means for setting a reference steady-state pressure reaching time on the premise that said pressure introduction characteristic exhibits a standard pressure introduction characteristic;
characteristic difference detection means for detecting a characteristic difference between said pressure introduction characteristic detected and said standard pressure introduction characteristic; and
steady-state pressure reaching time correction means for calculating said steady-state pressure reaching time by correcting said reference steady-state pressure reaching time based on said characteristic difference.

4. The trouble diagnostics apparatus for a fuel treatment system according to claim 2,
wherein said reference steady-state pressure reaching time setting means includes space volume detection means for detecting a space volume of said system including the fuel tank and, based on said space volume, sets said reference steady-state pressure reaching time.

5. A trouble diagnostics apparatus for a fuel treatment system, comprising:
a fuel tank;
a pressure introduction mechanism for introducing a positive pressure or a negative pressure to said fuel tank;
convergence value detection means for detecting, as a convergence value, a tank's internal pressure at a time upon which a steady-state pressure reaching time elapses after introduction of said positive pressure or negative pressure is started;
leak trouble determination means for determining, based on said convergence value, whether or not there is a leak occurring in a system including said fuel tank;
amount of air transferred estimation means for estimating an amount of air that is assumed to be transferred between said pressure introduction mechanism and said fuel tank as said pressure introduction mechanism is operated;
amount of air leaked estimation means for estimating an amount of air that is assumed to be leaked through said reference hole while said pressure introduction mechanism is operated in a case where there is a reference hole in said fuel tank,;
amount of air increased or decreased estimation means for estimating an amount of air that is assumed to be increased or decreased in said fuel tank based on said amount of air transferred and said amount of air leaked;
tank's internal pressure fluctuation amount calculation means for estimating a tank's internal pressure fluctuation amount corresponding to said amount of air increased or decreased according to a relation of an equation of state of gas;
pressure change estimation means for estimating changes in tank's internal pressure that are assumed to be made after an operation of said pressure introduction mechanism is started based on said tank's internal pressure fluctuation amount; and
steady-state pressure reaching time setting means for setting said steady-state pressure reaching time based on said changes in tank's internal pressure estimated.

6. The trouble diagnostics apparatus for a fuel treatment system according to claim 5,
wherein said amount of air transferred estimation means comprises:
differential pressure calculation means for calculating a differential pressure acting on both sides, of said pressure introduction mechanism based on said tank's internal pressure estimated by said pressure change estimation means;
total gas flow rate calculation means for calculating a total flow rate of gas to be circulated through said pressure introduction mechanism for said differential pressure estimated; and
mass fraction calculation means for calculating a mass fraction of air in said fuel tank;
wherein said amount of air transferred estimation means calculates said amount of air transferred to be generated for said differential pressure based on said total gas flow rate and said mass fraction; and
wherein said amount of air leaked estimation means calculates said amount of air leaked based on an atmospheric pressure and said tank's internal pressure estimated by said pressure change estimation means.

7. A trouble diagnostics apparatus for a fuel treatment system, comprising:
a fuel tank;
a pressure introduction mechanism for introducing a positive pressure or a negative pressure to said fuel tank;
amount of pressure change detection means for detecting an amount of change in said tank's internal pressure per unit time after introduction of said positive pressure or negative pressure is started;
convergence value detection means for detecting, as a convergence value, the tank's internal pressure at a time point when said amount of change in said tank's internal pressure per unit time becomes a criterion value or less; and
leak trouble determination means for determining whether or not there is a leak in a system including said fuel tank based on said convergence value.

8. The trouble diagnostics apparatus for a fuel treatment system according to claim 7,
wherein said amount of pressure change detection mean comprises:
amount of air transferred estimation means for estimating an amount of air transferred between said pressure introduction mechanism and said fuel tank during operation of said pressure introduction mechanism;

amount of air leaked estimation means for estimating an amount of air that is assumed to be leaked through said reference hole while said pressure introduction mechanism is operated in a case where there is a reference hole in said fuel tank;

amount of air increased or decreased estimation means for estimating an amount of air increased or decreased in said fuel tank based on said amount of air transferred and said amount of air leaked; and tank's internal pressure fluctuation amount calculation means for estimating a tank's internal pressure fluctuation amount corresponding to said amount of air increased or decreased according to a relation of an equation of state of gas;

wherein said amount of pressure change detection means detects the amount of change in said tank's internal pressure per unit time based on said tank's internal pressure fluctuation amount.

9. The trouble diagnostics apparatus for a fuel treatment system according to claim 8, wherein said amount of air transferred estimation means comprises:

pressure estimation means for estimating tank's internal pressure, that are assumed to be made after an operation of said pressure introduction mechanism is started based on said tank's internal pressure fluctuation amount;

differential pressure calculation means for calculating a differential pressure acting on both sides of said pressure introduction mechanism based on said tank's internal pressure estimated by said pressure estimation means;

total gas flow rate calculation means for calculating a total flow rate of gas to be circulated through said pressure introduction mechanism for said differential pressure estimated; and mass fraction calculation means for calculating a mass fraction of air in said fuel tank;

wherein said amount of air transferred estimation means calculates said amount of air transferred to be generated for said differential pressure base on said total gas flow rate and said mass fraction; and wherein said amount of air leaked estimation means calculates said amount of air leaked based on an atmospheric pressure and said tank's internal pressure estimated by said pressure estimation means.

* * * * *